(12) United States Patent
Jang et al.

(10) Patent No.: US 10,356,468 B2
(45) Date of Patent: Jul. 16, 2019

(54) INTELLIGENT AGENT SYSTEM COMPRISING TERMINAL DEVICES, AND CONTROL METHOD

(71) Applicant: LG ELECTRONICS INC., Seoul (KR)

(72) Inventors: Hyukjae Jang, Seoul (KR); Bumhyeon Baek, Seoul (KR); Jieun Kim, Seoul (KR); Youngyeon Seo, Seoul (KR); Keumsung Hwang, Seoul (KR); Minho Lee, Seoul (KR); Junsu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/741,200

(22) PCT Filed: Jul. 14, 2015

(86) PCT No.: PCT/KR2015/007289
§ 371 (c)(1),
(2) Date: Dec. 29, 2017

(87) PCT Pub. No.: WO2017/003005
PCT Pub. Date: Jan. 5, 2017

(65) Prior Publication Data
US 2018/0199098 A1   Jul. 12, 2018

(30) Foreign Application Priority Data

Jul. 1, 2015   (KR) .................. 10-2015-0093917

(51) Int. Cl.
*H04N 21/43*   (2011.01)
*H04N 21/436*   (2011.01)
(Continued)

(52) U.S. Cl.
CPC ....... *H04N 21/43615* (2013.01); *H04L 67/10* (2013.01); *H04L 67/148* (2013.01);
(Continued)

(58) Field of Classification Search
None
See application file for complete search history.

(56) References Cited

U.S. PATENT DOCUMENTS

| 6,774,246 B2 * | 8/2004 | Reuter | ................. C07C 51/265 |
| | | | 549/248 |
| 2007/0220554 A1 * | 9/2007 | Barton | ............... H04N 21/4668 |
| | | | 725/46 |

FOREIGN PATENT DOCUMENTS

| KR | 1020080002187 | 1/2008 |
| KR | 1020120049542 | 5/2012 |

(Continued)

OTHER PUBLICATIONS

PCT International Application No. PCT/KR2015/007289, Written Opinion of the International Searching Authority dated Apr. 1, 2016, 23 pages.

*Primary Examiner* — Cai Y Chen
(74) *Attorney, Agent, or Firm* — Lee, Hong, Degerman, Kang & Waimey

(57) ABSTRACT

An intelligent agent system comprising terminal devices and, a control method are disclosed. The control method for the intelligent agent system comprises the steps of: transmitting, by a first terminal device, data including context information of a user to a server; storing, by the server, the received data in a user profile; receiving, by the second terminal device, the data including the context information of the recognized user from a server, when a second terminal device recognizes the user; and detecting, by the second terminal device, current context information of the user and recommending a service to the user on the basis of the (Continued)

detected current context information of the user, the received context information, and the characteristics of the second terminal device.

18 Claims, 31 Drawing Sheets

(51) Int. Cl.
*H04N 21/442* (2011.01)
*H04N 21/45* (2011.01)
*H04N 21/466* (2011.01)
*H04N 21/4788* (2011.01)
*H04N 21/41* (2011.01)
*H04N 21/414* (2011.01)
*H04N 21/658* (2011.01)
*H04L 29/08* (2006.01)
*H04M 1/725* (2006.01)

(52) U.S. Cl.
CPC ... *H04N 21/4104* (2013.01); *H04N 21/41407* (2013.01); *H04N 21/44222* (2013.01); *H04N 21/4532* (2013.01); *H04N 21/4668* (2013.01); *H04N 21/4788* (2013.01); *H04N 21/6582* (2013.01); *H04M 1/72569* (2013.01)

(56) References Cited

FOREIGN PATENT DOCUMENTS

| KR | 1020130099287 | 9/2013 |
| KR | 1020140003043 | 1/2014 |
| WO | 2015030347 | 3/2015 |

* cited by examiner

FIG. 14

| IAL | time | situation | Recommended by agent | device |
|---|---|---|---|---|
| | 17:00 | Before getting off work | Display traffic information<br>1. route to fitness center<br>2. route to home | Check location information |
| | 17:30 | Getting off time | Display information on fast route (context – attending office using car) | Receive information on fast route |
| | 17:40 | While heading to parking lot | Execute music app<br>execute exercise assistant app (Friday exercise review)<br>(context – since it is unable to see the app while driving) | Receive information on fast route (refresh) |
| | 17:50 | In the car | Execute music app execute navigation<br>(destination is fitness center) (context – fitness center on Monday) | Check location information |
| | 18:30 | In the car | Execute music app (device property – it is unable to watch video using navigation while driving, context – execute music app) | Check location information |
| | 19:00 | Arrive at fitness center | Music app on + execute exercise assistant app (user uses watch only)<br>Music app off (navigation music off, watch music on) | Check location information |
| | 19:30 | exercise | | Sensor on<br>Collect user exercise information |
| | 20:30 | Before going home | Music app off | |
| | 21:00 | Parking lot | Display route to home<br>Execute navigation (context – destination is home) | Receive information on fast route (refresh) |
| | 21:30 | In the car | Execute music app (context, device property) | |

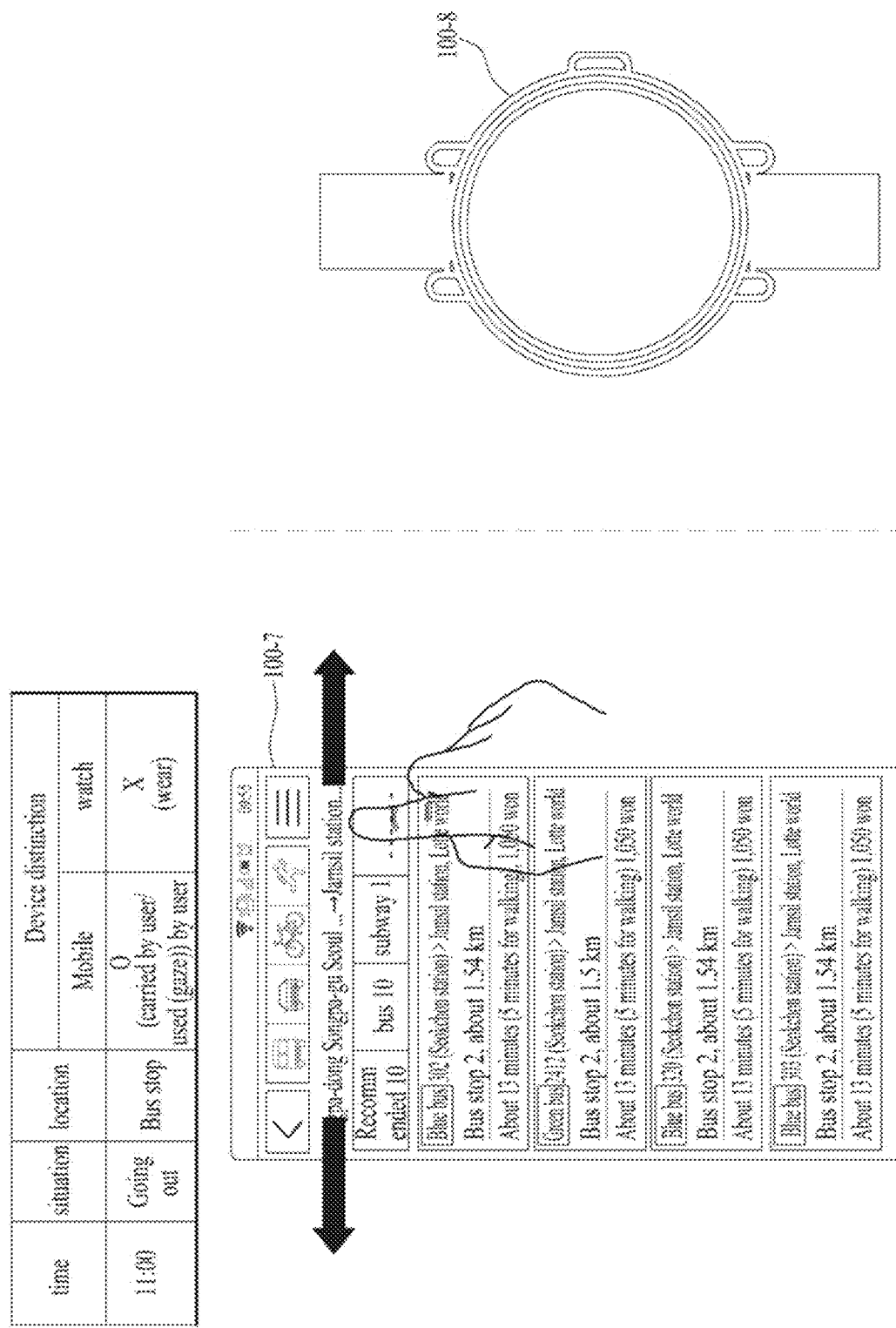

FIG. 18
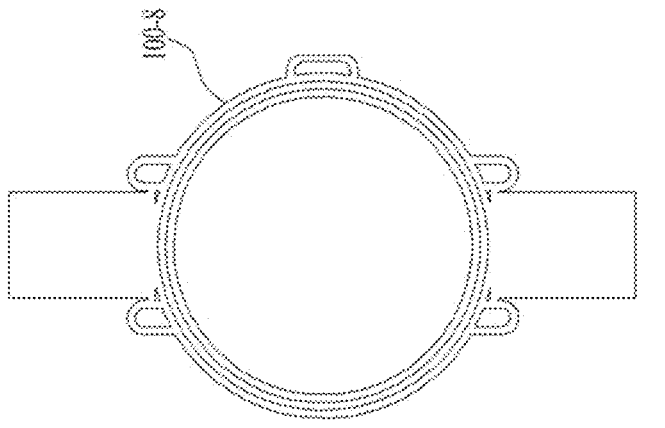
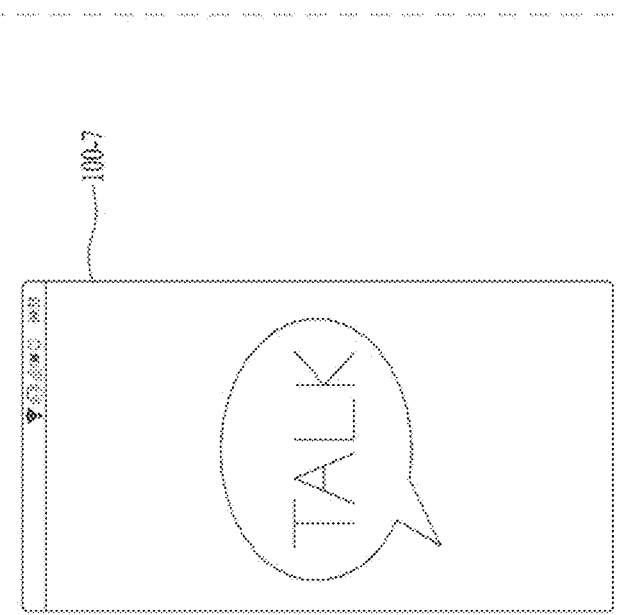

FIG. 20
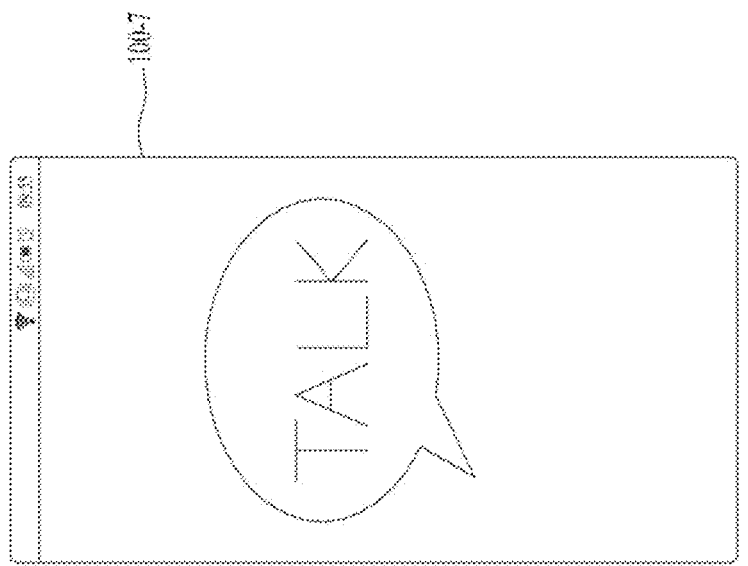
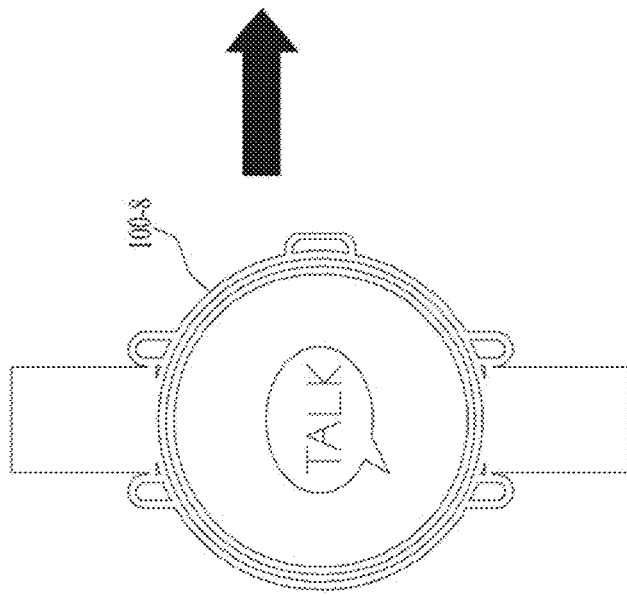

INTELLIGENT AGENT SYSTEM COMPRISING TERMINAL DEVICES, AND CONTROL METHOD

CROSS-REFERENCE TO RELATED APPLICATIONS

This application is the National Stage filing under 35 U.S.C. 371 of International Application No. PCT/KR2015/007289, filed on Jul. 14, 2015, which claims the benefit of earlier filing date and right of priority to Korean Application No. 10-2015-0093917, filed on Jul. 1, 2015, the contents of which are all hereby incorporated by reference herein in their entirety.

TECHNICAL FIELD

The present invention relates to intelligent agent system comprising terminal devices and control method.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Some mobile terminals include additional functionality which supports game playing, while other terminals are configured as multimedia players. More recently, mobile terminals have been configured to receive broadcast and multicast signals which permit viewing of content such as videos and television programs.

To support and increase the mobile terminal functions, it may be able to consider the improvement of structural parts and/or software parts of the mobile terminal.

Meanwhile, a user may carry a plurality of terminal devices. The user may use a different terminal device while using a terminal device. In this case, the user may want to execute contents used to be executed in a previous terminal device in a current terminal device. And, the user may want to process a work used to be processed in the previous terminal device in the current terminal device. Hence, it is necessary to have a technology for intelligently controlling a terminal device.

DISCLOSURE OF THE INVENTION

Technical Tasks

A technical task of the present invention is to solve the abovementioned problem and other problems. Another technical task of the preset invention is to provide an intelligent agent system including a terminal device capable of sharing works performed in a plurality of terminal devices and providing the shared works based on a property of each of a plurality of the terminal devices and a controlling method therefor.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of controlling an intelligent agent system, includes the steps of transmitting, by a first terminal device, data including context information of a user to a server, storing, by the server, the received data in a user profile, if a second terminal device recognizes a user, receiving, by the second terminal device, data including context information of the recognized user from the server, and sensing, by the second terminal device, current context information of the user and recommending a service to the user based on the sensed current context information of the user, the received context information, and a property of the second terminal device.

The method can further include the step of transmitting, by the second terminal device, the data including the sensed current context information of the user to the server.

The method can further include the step of maintaining, by the second terminal device, turn-on of an intelligent agent layer in a standby state and sensing the current context information of the user.

Meanwhile, the property of the second terminal device can include at least one of whether or not the second terminal device comprises a display unit, a size of a display unit, whether or not the second terminal device includes an audio unit, output strength of an audio unit, whether or not the second terminal device outputs a vibration, and whether or not the second terminal device receives a touch input.

The user can be recognized using at least one of fingerprint recognition, face recognition, voice recognition, an input pattern, or a password.

Meanwhile, the step of recommending the service can output an intelligent agent.

If there is no service to be recommended in the step of recommending the service, the intelligent agent may inquire of a user about a service to be provided.

The method can further include the step of providing, by the second terminal device, the recommended service to the user.

If the service includes an image but the second terminal device does not include a display unit in the step of providing the recommended service, the second terminal device can provide the service via voice.

If a third terminal device recognizing a user exists and the third terminal device includes a display unit in the step of proving the recommended service, the third terminal device can provide the service.

If the service includes an image and a display unit of the second terminal device has a size smaller than a predetermined size capable of providing the image of the service, the step of providing the recommended service can provide an image including summary information of the service.

If the service includes an image and a display unit of the second terminal device displays different contents, the step of providing the recommended service can provide the service on a predetermined area of the display unit.

If a third terminal device recognizing a user exists in the step of proving the recommended service, both the second terminal device and the third terminal device can provide the service.

To further achieve these and other advantages and in accordance with the purpose of the present invention, according to a different embodiment, an intelligent agent system includes a first terminal device configured to transmit data including context information of a user to a server, a server configured to store the received data in a user profile, and, if a user is recognized, a second terminal device configured to receive data including context information of the recognized user from the server. In this case, the second terminal device is configured to sense current context information of the user and recommend a service to the user based on the sensed current context information of the user, the received context information, and a property of the second terminal device.

The second terminal device maintains turn-on of an intelligent agent layer in a standby state and can sense the current context information of the user.

The second terminal device can output an intelligent agent.

The second terminal device can provide the recommended service to the user.

If the service includes an image but the second terminal device does not include a display unit, the second terminal device can provide the service via voice.

Meanwhile, the intelligent agent system can further include a third terminal device configured to recognize a user. In this case, if the third terminal device includes a display unit, the third terminal device can provide the service.

To further achieve these and other advantages and in accordance with the purpose of the present invention, according to a further different embodiment, a method of controlling a terminal device includes the steps of, if a user is recognized, receiving data including context information of the recognized user from a server, sensing current context information of the user, and recommending a service to the user based on the sensed current context information of the user, the received context information, and a property of the terminal device.

Advantageous Effects

Effects of a mobile terminal and controlling method thereof according to the present invention are described as follows.

According to at least one of embodiments of the present invention, it is able to share and apply a pattern of a user learned by a plurality of terminal devices.

According to at least one of embodiments of the present invention, a terminal device can learn a pattern of a user and provide the best service to the user.

According to at least one of embodiments of the present invention, a terminal device can provide a service to a user by reflecting a property of the terminal device to the service.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 14 is a diagram for explaining one embodiment of a terminal device sensed by an intelligent agent system and a user pattern including time;

FIG. 15 is a diagram for explaining a first embodiment that an intelligent agent system provides a service to a user;

FIG. 18 is a diagram for explaining a fourth embodiment that an intelligent agent system provides a service to a user;

FIG. 20 is a diagram for explaining a sixth embodiment that an intelligent agent system provides a service to a user;

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
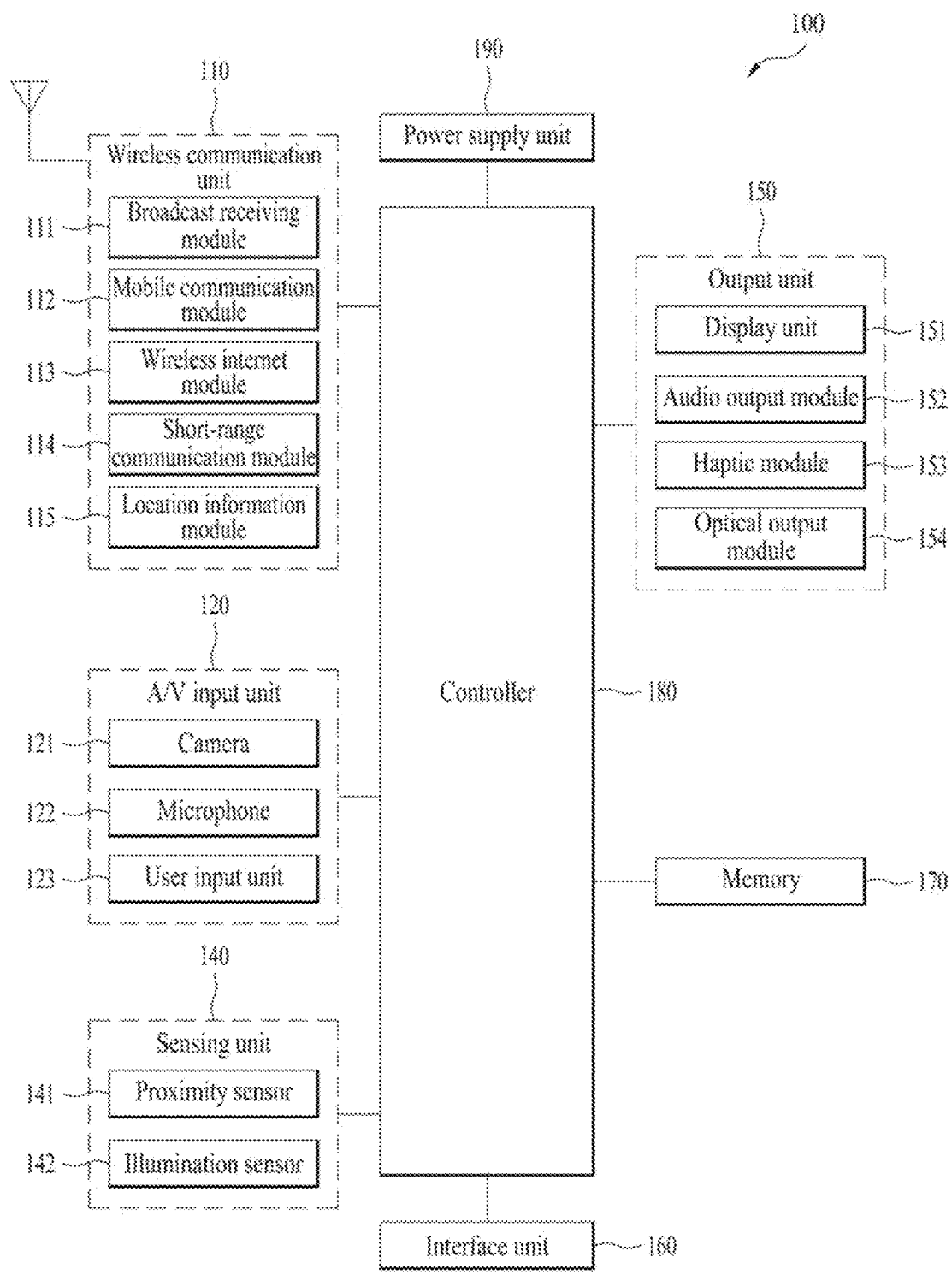
FIG. 1A is a block diagram to describe a mobile terminal related to the present invention.
Figure 1B:
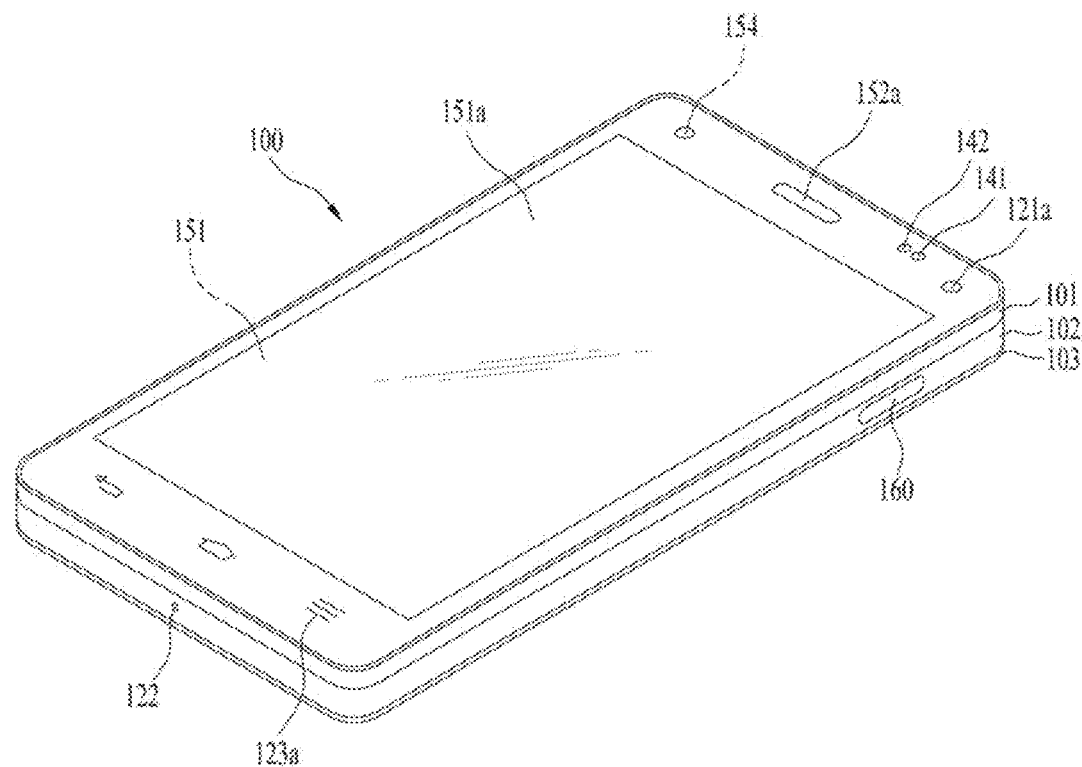
FIG. 1B and FIG. 1C are conceptual diagrams for one example of a mobile terminal related to the present invention in different views.
Figure 1C:
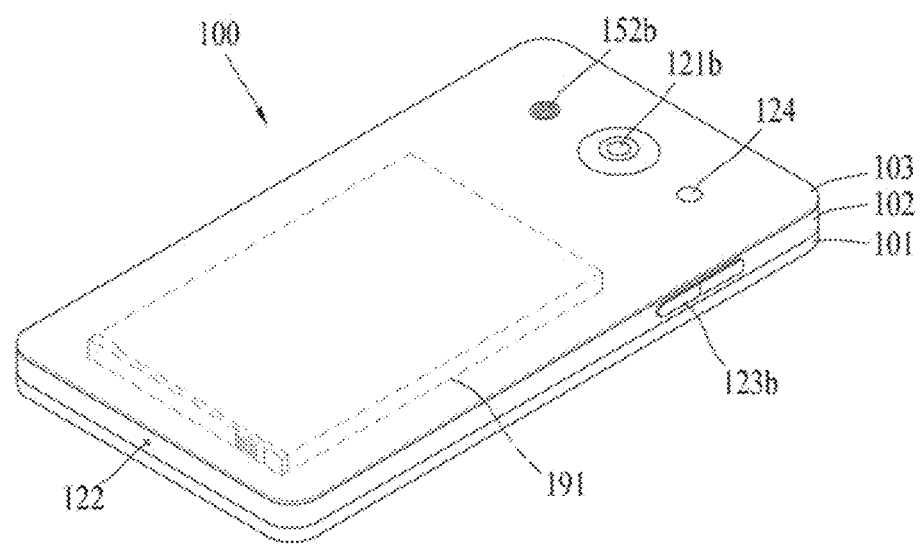

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

For instance, the wireless communication unit 110 typically includes one or more components which permit wireless communication between the mobile terminal 100 and a wireless communication system or network within which the mobile terminal is located.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, and the like) for allowing a user to input information. Data (for example, audio, image, and the like) is obtained by the input unit 120 and may be analyzed and processed by controller 180 according to user commands thereof.

The sensing unit 140 is typically implemented using one or more sensors configured to sense internal information of the mobile terminal, the surrounding environment of the mobile terminal, user information, and the like. For example, in FIG. 1A, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

Moreover, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components can cooperatively operate to implement operations, controls and controlling methods of the mobile terminal according to various embodiments described in the following. The operations, controls or controlling methods of the mobile terminal can be implemented on the mobile terminal by running at least one application program saved to the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi) and Wi-Fi Direct, and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

In this case, the terminal body can be construed as the concept of indicating the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display an execution screen information of an application operated in the mobile terminal or User Interface, Graphic User Interface corresponding to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Moreover, the display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like.

In the present drawing, the first manipulation unit 123a is a touch key for example, by which the present invention is non-limited. For instance, the first manipulation unit 123 may include a push key (i.e., a mechanical key) or a combination of the touch key and the push key.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

The battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
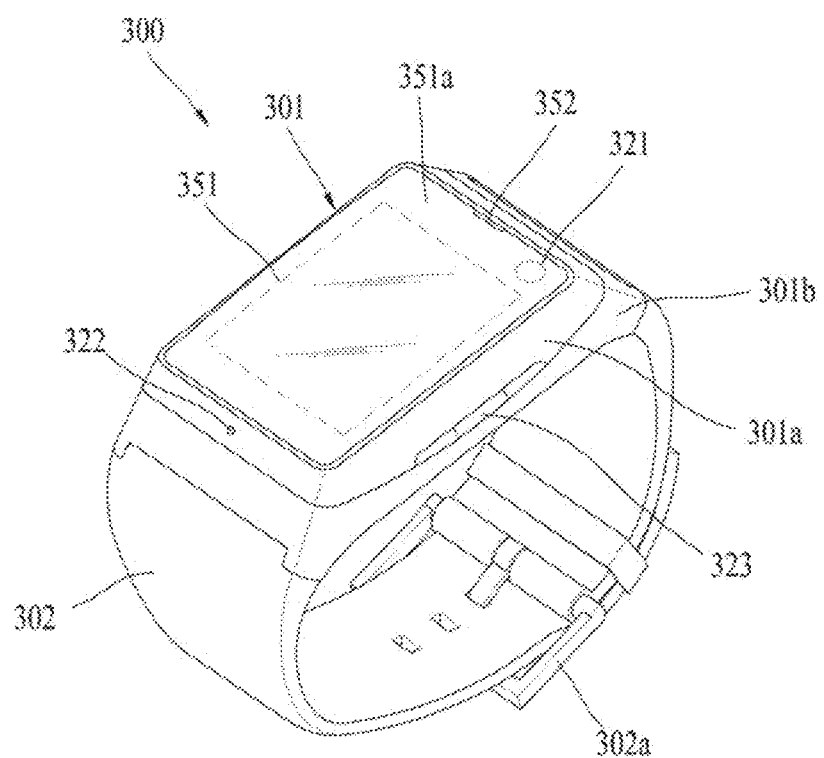
FIG. 2 is a perspective diagram for an example of a mobile terminal of watch-type according to a different embodiment of the present invention.

FIG. 2 is a perspective view illustrating one example of a watch-type mobile terminal 300 in accordance with another exemplary embodiment.

Figure 3:
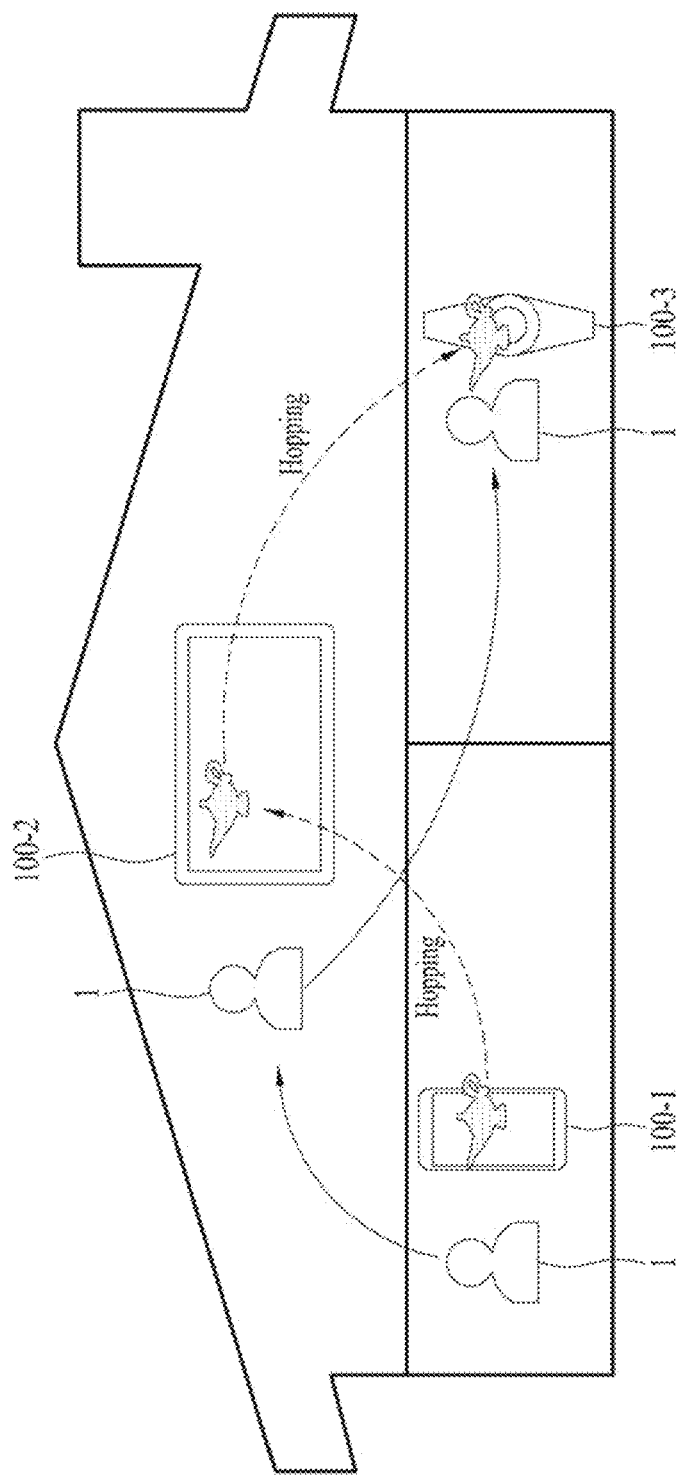
FIG. 3 is a diagram for explaining an intelligent agent system according to one embodiment of the present invention.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

In the following, a control method capable of being implemented in a mobile terminal device and related embodiments are explained with reference to the attached drawings. It is apparent to those skilled in the art that the present invention can be modified to a specific form within a scope of not deviating from the idea and the essential characteristic of the present invention.

FIG. 3 is a diagram for explaining an intelligent agent system according to one embodiment of the present invention.

Referring to FIG. 3, there are a plurality of terminal devices 100-1/100-2/100-3. In FIG. 3, although it is depicted as each of a plurality of the terminal devices 100-1/100-2/100-3 is located at a different space, a plurality of the terminal devices 100-1/100-2/100-3 may be located at the same space. And, a plurality of the terminal devices can include an intelligent agent (IA).

In general, a program or a system periodically collecting information and performing a certain service without a user involvement in dynamic environment is referred to as an IA. The IA interacts with external environment using a sensor. The external environment may correspond to an operating system, a network, and the like. The IA may have a knowledge base and a reasoning function and may be able to solve a problem by exchanging information and performing communication with a user, a resource, or a different agent.

The IA autonomously determines and operates without direct/indirect interference of a different object, controls an operation or a state, and can interact with a human or a different agent using a communication language. And, the IA recognizes environment such as a system, Internet, and the like, responds to a change of the environment, and operates with the initiative. And, the IA can perform not a one-time operation but a consistent operation in response to a similar input.

In the present specification, each of a plurality of terminal devices may correspond to a device including the IA. The IA may exist in a form of a layer in a manner of being embedded in a terminal device. In some cases, a terminal device itself may be referred to as an IA. The IA may respond to a stimulus of a user. The IA extracts information from the IA, senses information on a user, transmits the information to a server (or, a cloud), and receives information from the server. The IA combines the extracted information, the sensed information, and the received information and may be able to provide a best service to a user.

A user 1 can use a first terminal device 100-1. An intelligent agent (IA) of the first terminal device 100-1 can sense a use pattern of the user. For example, the use pattern of the user can include day of the week, time, an application in use, contents in use, hours of use, and the like. The first terminal device 100-1 can transmit sensed information to a server. The server generates a user profile according to a user and stores received information.

The user 1 may stop using the first terminal device 100-1 and use a second terminal device 100-2. In order for the user 1 to use the second terminal device 100-2, a user authentication procedure can be performed. For example, the user authentication procedure can be performed via a fingerprint recognition procedure, a face recognition procedure, a voice recognition procedure, an input pattern checking procedure, or a password checking procedure. If a user is recognized, the second terminal device 100-2 asks a server to transmit context information of the recognized user and receives the context information. The context information may correspond to currently sensed various information and information on an application, a file, a data, and contents in use.

The IA of the second terminal device 100-2 can sense current context information. And, the IA may recommend a service to the user 1 in consideration of the current context information, received context information, and the characteristic of the second terminal device 100-2. For example, the IA may recommend a work used to be performed in the first terminal device 100-1 or an application used to be executed in the first terminal device 100-1 to the user 1. Or, the IA may recommend a best service to the user 1 in consideration of the received context information and the current context information. The user 1 may recognize it as the IA of the first terminal device 100-1 moves to the second terminal device 100-2 and provides a service to the user 1. And, the second terminal device 100-2 can transmit sensed information to a server. The server can store the received information in a user profile according to a user.

Similarly, the user 1 stops using the second terminal device 100-2 and may use a third terminal device 100-3. The user 1 can use the third terminal device 100-3 via an authentication procedure. The third terminal device 100-3 asks the server to transmit context information of a recognized user, receives the context information from the server, and can sense current context information. And, the third terminal device 100-3 can recommend and provide a service to the user 1 in consideration of the received information, sensed information, and the characteristic of the terminal device. In the following, a structure of a terminal device and a layered structure between a server and a terminal device are explained.

Figure 4:
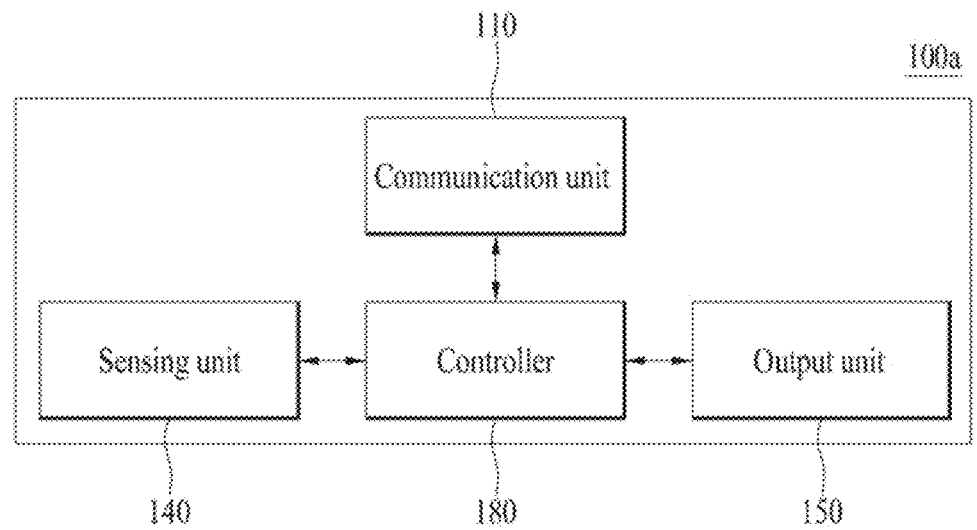
FIG. 4 is a block diagram for a terminal device according to one embodiment of the present invention.

FIG. 4 is a block diagram for a terminal device according to one embodiment of the present invention.

Referring to FIG. 4, a terminal device 100a can include a communication unit 110, a sensing unit 140, an output unit 150, and a controller 180.

The sensing unit 140 can sense user information for performing authentication and current context information of a user. For example, the sensing unit 140 can include a fingerprint recognition module to sense fingerprint information. Or, the sensing unit 140 can be implemented by a camera to receive an input of a face image of a user. And, the sensing unit 140 can include various sensors to sense whether or not the terminal device 100a is gripped, a state of the terminal device 100a, and a position and a direction of the terminal device 100a. Or, the sensing unit can sense a sleep state of a user, bio information, surrounding environment information, and the like. The context information may correspond to information including currently sensed various information, information on a currently used application, a file, a data, and contents.

The communication unit 110 can receive context information of a user determined via a user authentication procedure from a server and transmit currently sensed context information to the server. Meanwhile, the communication unit 110 can include a location information module. The location information module can obtain location information of the terminal device 100a.

The controller 180 can recommend a service to a user based on currently sensed context information of a user, received context information, and the characteristic of the terminal device. The terminal device 100a includes an intelligent agent (IA) layer in a software manner and the IA can recommend a service to a user. Yet, IA software may operate in the controller 180 in a hardware manner. An embodiment of recommending a service to a user recommended by the controller 180 is explained later. Meanwhile, the controller 180 may include a separate IA module for operating the IA only. In this case, the terminal device 100a can maintain a turn-on state of the IA module even in a standby state. If necessary, the IA module may wake a different configuration unit of the terminal device 100a up to collect contexts of a user. For example, the IA module maintaining the turn-on state can periodically wake the sensing unit 140 up. If there is no change near a user or surrounding environment, the sensing unit 140 may return to the standby state. If a change occurs near a user or surrounding environment, the sensing unit 140 senses changed information and transmits the information to the IA module and the IA module can turn on the terminal device 100a.

Figure 5:
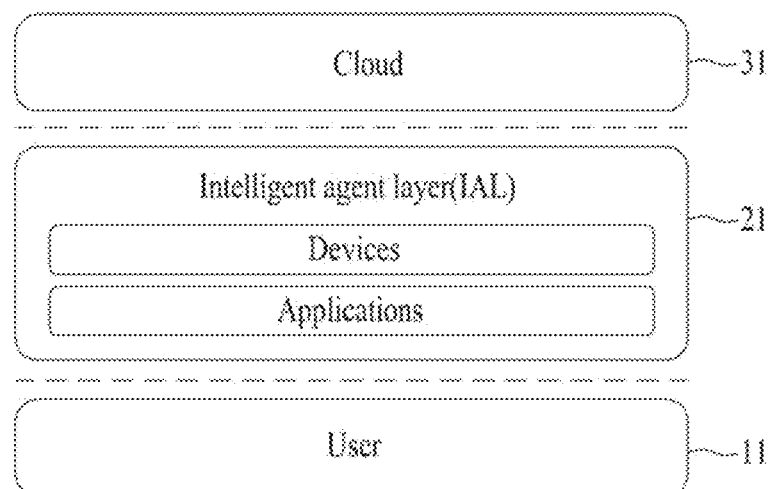
FIG. 5 is a diagram for hierarchically explaining one embodiment of an intelligent agent system on the basis of a terminal device.

FIG. 5 is a diagram for hierarchically explaining one embodiment of an intelligent agent system on the basis of a terminal device.

Referring to FIG. 5, an intelligent agent system can include an intelligent agent layer (IAL) 21 and a cloud 31. The intelligent agent system senses a pattern of a user, and the like, generates context information, and can provide a service to the user using the generated context information. The terminal device can receive a command input from the user or sense an activity of the user. The intelligent agent layer 21 obtains information on an application executed according to the inputted command and information on the activity sensed by the terminal device. The intelligent agent layer 21 can transmit the obtained information to the cloud 31.

Or, if a user is checked, the intelligent agent layer 21 can receive information on the checked user from the cloud 31. The intelligent layer 21 may execute an appropriate application or output data to an external of the terminal device based on the received information.

Figure 6:
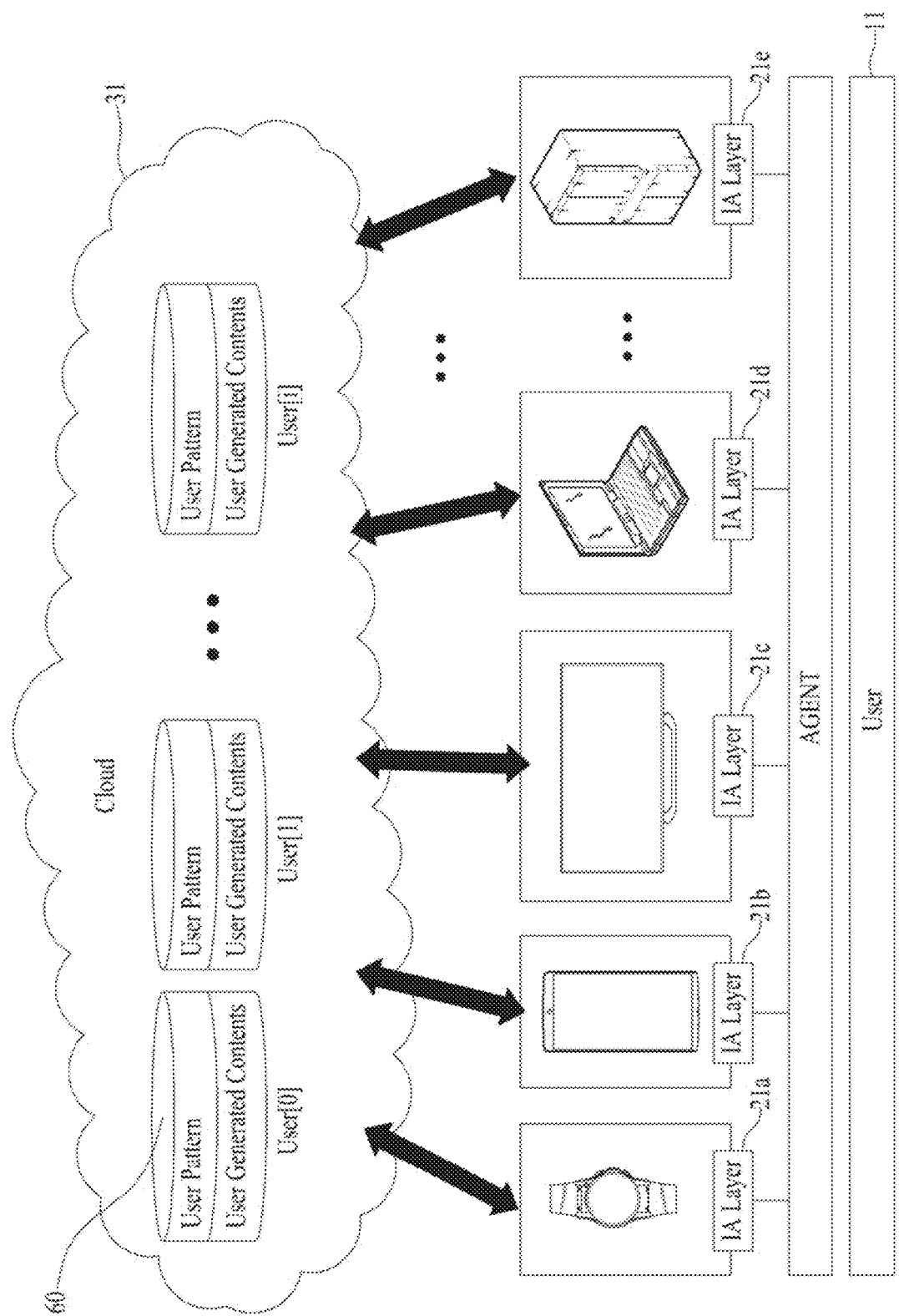
FIG. 6 is a diagram for hierarchically explaining an intelligent agent system including a plurality of terminal devices according to one embodiment of the present invention.

FIG. 6 is a diagram for hierarchically explaining an intelligent agent system including a plurality of terminal devices according to one embodiment of the present invention.

FIG. 6 illustrates an intelligent agent system including a plurality of terminal devices. In general, a user 11 may own a plurality of terminal devices. And, the user 11 may use a plurality of the terminal devices simultaneously or alternately. Each of a plurality of the terminal devices can include an intelligent agent layer 21a/21b/21c/21d/21e. And, a cloud 31 generates a user profile for a plurality of users and stores the user profile. For example, a user [0] and a user [1] may correspond to family members. The user [0] may own a smart watch and a smartphone. The user [1] may own a smartphone and a notebook. And, the user [0] and the user [1] may jointly own a TV and a refrigerator. If the IAL 21a of the smart watch recognizes the user [0], the IAL 21a of the smart watch can transmits context information of the user [0] to the cloud 31. If the user [0] watches contents using the TV, the IAL 21c of the TV recognizes the user [0] using a face recognition method or the like and can transmit context information of the user [0] to the cloud 31. Similarly, if the IAL 21d of the notebook recognizes the user [1], the IAL 21d of the notebook can transmit context information of the user [1] to the cloud 31. If the user [1] uses the refrigerator, the IAL 21e of the refrigerator can transmit the context information of the user [1] to the cloud 31 using a fingerprint recognition method or the like.

The cloud 31 can store the context information received from each of the terminal devices by classifying the context information according to a user. For example, the cloud 31 generates a profile 60 of the user [0] and can store such information as a user pattern of the user [0], contents used by the user [0], and the like in the generated profile. Similarly, the cloud 31 generates a profile of the user [1] and can store context information of the user [1] in the generated profile.

If an IAL of a terminal device asks the cloud 31 to transmit context information on a specific user, the cloud can transmit the context information to the IAL. For example, when the user [0] uses the smartphone, the IAL 21b of the smartphone requests context information of the user [0] to the cloud, receives the information from the cloud, and provides a service to the user [0] based on the received context information.

Figure 7:
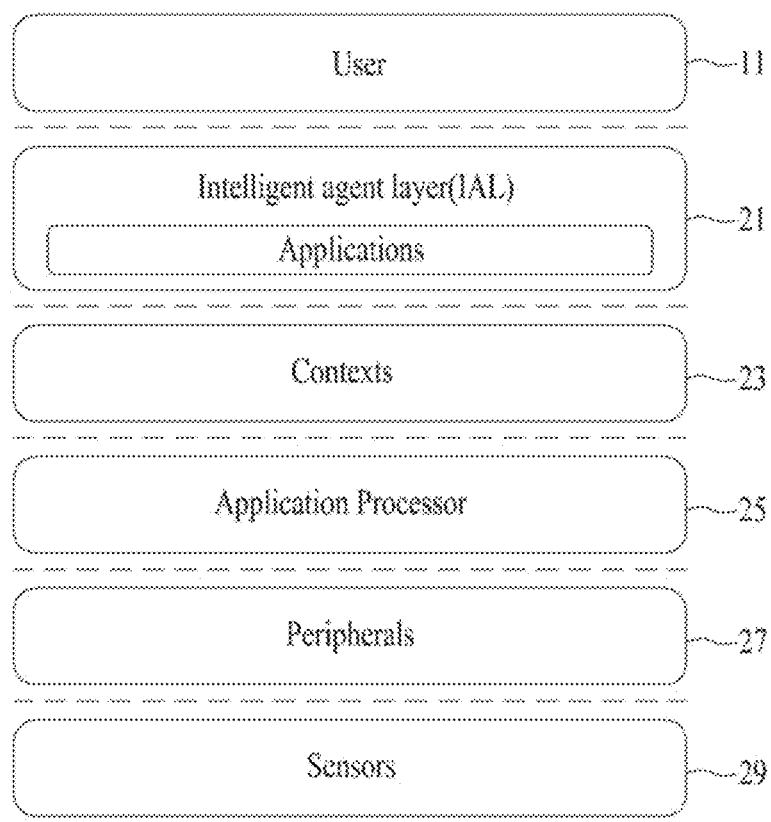
FIG. 7 is a diagram for hierarchically explaining an intelligent agent system that senses a user context according to one embodiment of the present invention.

FIG. 7 is a diagram for hierarchically explaining an intelligent agent system that senses a user context according to one embodiment of the present invention. An intelligent agent system can include a sensor 19, a peripheral module 27, an application processor 25, contexts 23, and an intelligent agent layer (IAL) 21. FIG. 7 illustrates a layer configured to sense user context without distinguishing hardware from software.

The sensor 25 can collect surrounding environment information, information related to a terminal device, and information related to a user. The peripheral module 27 can process the information collected by the sensor 25. And, the peripheral module 27 can include a GPS capable of collecting location information, call history information, and the like, a short distance communication module, and a communication module. In particular, the intelligent agent system can sense individual information constructing contexts and process sensed information using the sensor 29 and the peripheral module 27.

The application processor 25 can process the sensed information into meaningful information or generate the contexts 23 using the sensed information. For example, although sensed heartbeat information is just bit information, the application processor 25 can determine or classify the sensed bit information as heartbeat information. The application processor processes the sensed bit information together with time information and other information of a user to generate the contexts 23. As mentioned in the foregoing description, the contexts 23 can be generated via the application processor 25. The IAL 21 can output the generated contexts 23 to a user using an application. And, the IAL 21 can transmit the generated contexts 23 to a cloud (not depicted).

Figure 8:
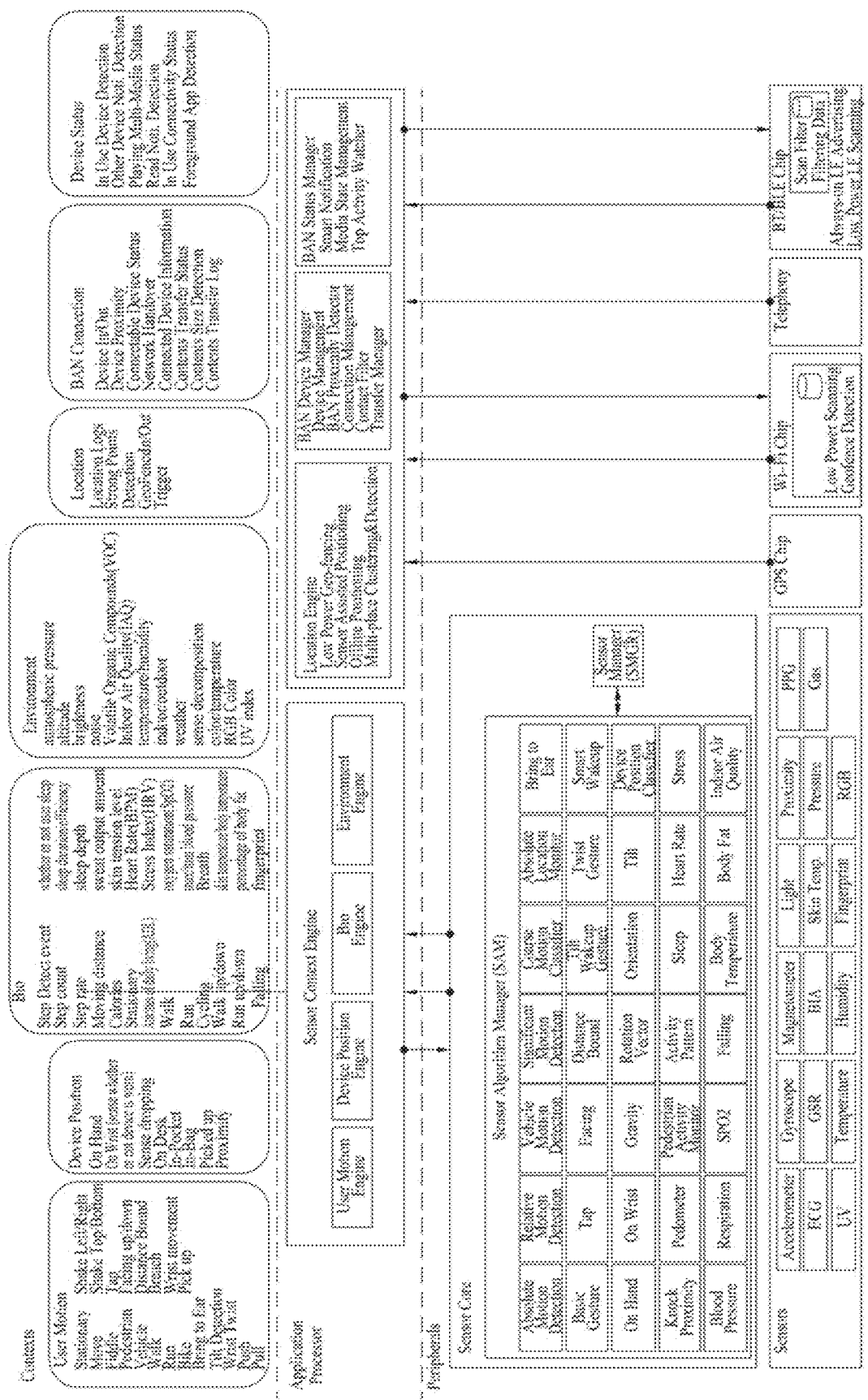
FIG. 8 is a diagram for explaining user context information sensed according to one embodiment of the present invention.

FIG. 8 is a diagram for explaining user context information sensed according to one embodiment of the present invention. FIG. 8 illustrates a specific example of the intelligent agent system layer configured to sense user context mentioned earlier in FIG. 7. For example, the sensors include an acceleration sensor, a gyro sensor, a terrestrial magnetism sensor, a proximity sensor, a humidity sensor, and the like and sense surrounding environment information. And, the peripheral sensor includes a sensor core, a GPS module, a short distance communication module, and the like and processes the information sensed by the sensors. Or, the peripheral module can collect call history information, location information, and the like. The application processor can include various engines. The various engines can generate contexts using relevant information. The generated contexts can be classified according to a type.

In the following, a specific embodiment for providing a service using contexts is explained.

Figure 9:
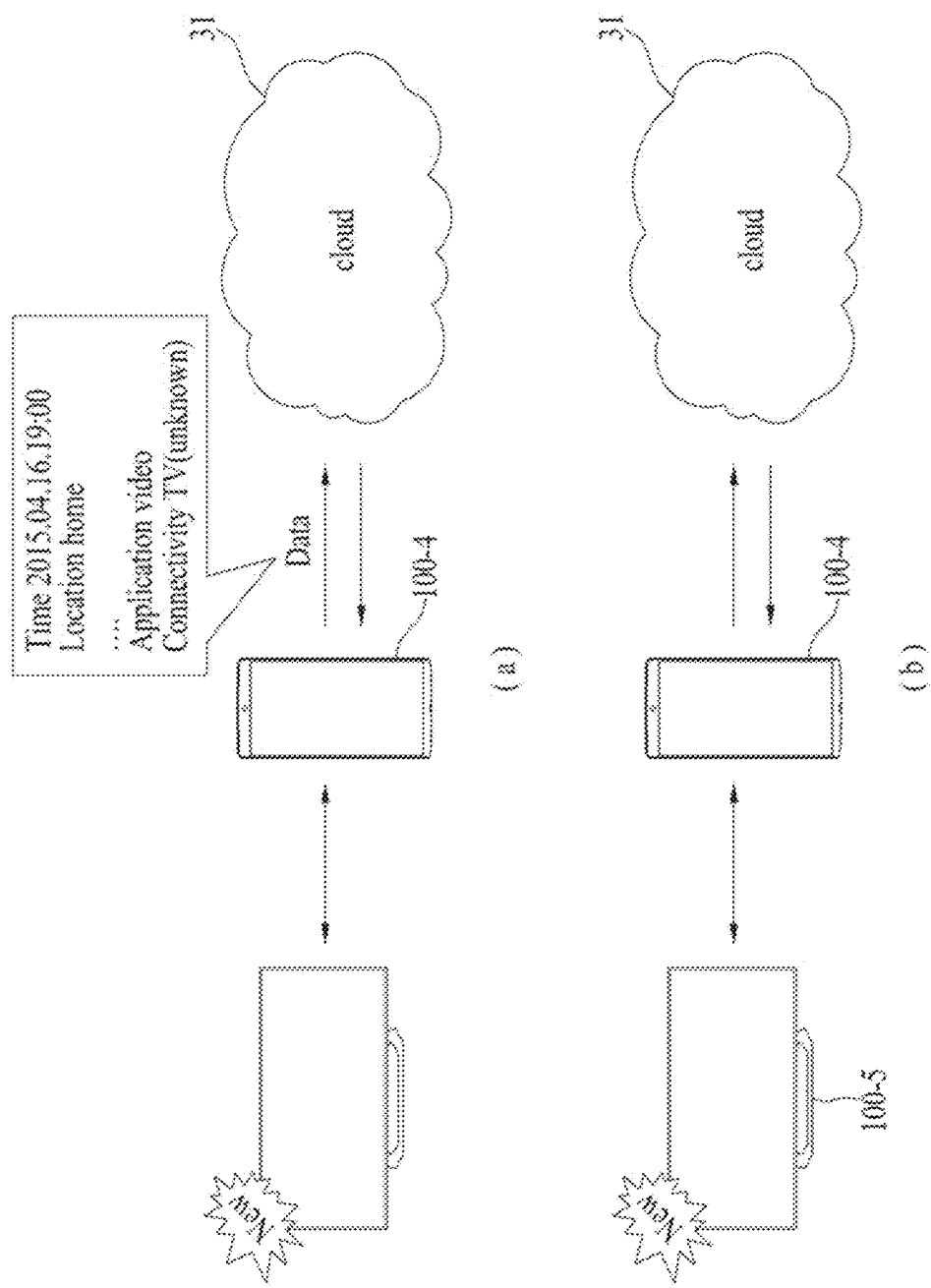
FIG. 9 is a diagram for explaining a procedure of registering a new terminal device according to one embodiment of the present invention.

FIG. 9 is a diagram for explaining a procedure of registering a new terminal device according to one embodiment of the present invention.

FIG. 9 (a) illustrates a procedure of automatically registering a new terminal device 100-5. As mentioned in the foregoing description, the cloud 31 can store user context by generating a profile according to a user. In order for the cloud 31 to store the context, user information and information on a terminal device are necessary. In particular, the cloud 31 can store the received context by checking the user information and the information on the terminal device. Hence, it is necessary to have the information on the terminal device used by a user. If the new terminal device 100-5 is searched, the cloud 31 can automatically register the new terminal device 100-5.

If the new terminal device 100-5 includes an internet communication function, the new terminal device 100-5 can be registered by directly performing communication with the cloud 31. For example, if a user uses the new terminal device 100-5, the new terminal device 100-5 can recognize the user by performing a user authentication procedure. For example, the user authentication procedure can be performed using fingerprint recognition, face recognition, voice recognition, an input pattern, or a password. The new terminal device 1005 can transmit user information to the cloud 31. The cloud 31 can check a user profile corresponding to the received user information. If information on the new terminal device 100-5 does not exist in the user profile, the cloud 31 may request the information on the new terminal device 100-5 to the new terminal device. If the new terminal device 100-5 transmits the information on the new terminal device to the cloud 31, the cloud 31 can register the new terminal device 100-5 at terminal device information of the user profile via an authentication procedure. In this case, the new terminal device 100-5 can output a message to a user to check whether to register the new terminal device 100-5. If the user rejects the registration of the new terminal device 100-5, the cloud 31 may not collect information, context, and the like sensed by the new terminal device 100-5.

If the new terminal device 100-5 does not include the internet communication function, the new terminal device 100-5 can be registered at the cloud 31 using a different terminal device 100-4 including the internet communication function. The terminal device 100-4 including the internet communication function and the new terminal device 100-5 can be connected with each other via a short distance communication network or in wired. The new terminal device 100-5 can perform communication with the cloud 31 via the terminal device 100-4 including the internet communication function. A procedure of registering the new terminal device 100-5 at a user profile of the cloud 31 is identical to the aforementioned procedure except the use of the terminal device 100-4 including the internet communication function. Meanwhile, when the new terminal device 100-5 is registered at the cloud via the terminal device 100-4 including the internet communication function, the new terminal device 100-5 can be registered with a simple authentication using preregistered account information of the terminal device 100-4 including the internet communication function. In order for the new terminal device 100-5 to transceive context with the cloud and provide a service to a user using the received or generated context, the new terminal device 100-5 needs to have an intelligent agent layer. If the new terminal device 100-5 does not include the intelligent agent layer, the cloud 31 can install the intelligent agent layer in the new terminal device 100-5.

FIG. 9 (b) illustrates a procedure of directly registering the new terminal device 100-5 at the cloud. If the new terminal device 100-5 includes an internet communication function, a user can register the new terminal device 100-5 at the cloud 31. A method for the new terminal device 100-5 to authenticate a user can be selected by the user. The new terminal device 100-5 can be registered at the cloud 31 by transmitting such information as a type of the terminal device, a service provided by the terminal device, data collected by the terminal device, and the like to the cloud 31.

If the new terminal device 100-5 does not include the internet communication function, the new terminal device 100-5 can be registered at the cloud 31 using a different terminal device 100-4 including the internet communication function. In particular, the new terminal device 100-5 transmits information for registering at the cloud to the cloud 31 using the different terminal device 100-4 including the internet communication function.

Meanwhile, when a user uses a terminal device, the user may replace the terminal device with a different terminal device of the same type. For example, the user may replace a smartphone (old smartphone) with a new smartphone after using the smartphone in years. Contexts stored by the old smartphone can be stored in the cloud 31. If the user purchases the new smartphone and completes user authentication, the cloud 31 can recognize the existence of the new smartphone. The cloud 31 registers information of the new smartphone and can transmit contexts. A specific embodiment is identical to the aforementioned procedure.

Figure 10:
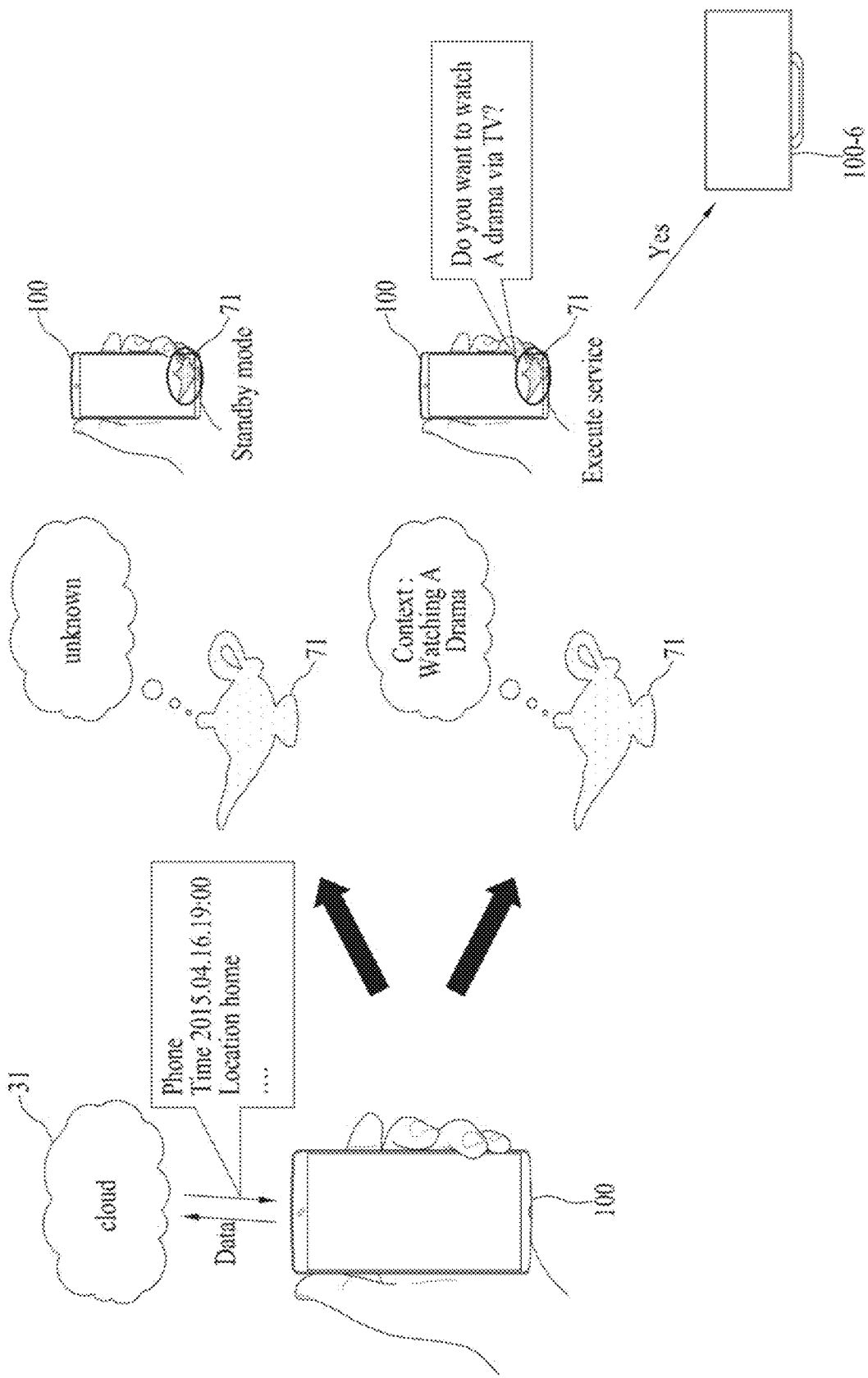
FIG. 10 is a diagram for explaining one embodiment of operating an intelligent agent.

FIG. 10 is a diagram for explaining one embodiment of operating an intelligent agent.

A cloud 31 and a terminal device 100 can perform communication. The terminal device 100 can transmit generated context to the cloud 31. And, the terminal device 100 can receive stored context from the cloud 31. An intelligent agent layer (IAL) of the terminal device 100 can detect a service to be provided from the generated context or the received context. An IA 71 can be outputted from the terminal device 100. In particular, the IA 71 can be outputted from a terminal device including a display unit as an image. Or, the IA 71 can be outputted from a terminal device including an audio unit as a sound. The sound can include voice. Or, the IA 71 can be outputted from a terminal device including a vibration motor as a predetermined vibration. A user can recognize the operating IAL via the outputted IA 71.

As mentioned in the foregoing description, the IAL can detect a service to be provided using context. If the IAL fails to detect a service to be provided, the outputted IA 71 can maintain a standby state without recommending a service. Or, the IA 71 may inquire of a user about a service to be provided. If the IAL detects a service to be provided, the outputted IA 71 can recommend the service to a user. The IA 71 outputs a type of a service to be provided and may inquire of a user about whether to execute the service. If the user selects to execute the recommended service, the terminal device 100 can execute the recommended service. In some cases, the terminal device 100 may provide the recommended service to a user in a manner of being associated with a different terminal device adjacent to the terminal device 100. For example, if the terminal device 100 and a TV 100-6 are positioned near a user and the user currently uses the terminal device 100, IAL of the terminal device 100 may recommend a service to the user. If the recommended service corresponds to playback of a drama, the IAL of the terminal device 100 may determine that it is appropriate for the TV to provide the recommended service. Hence, the IAL of the terminal device 100 performs communication with IAL of the TV 100-6 and the IAL of the TV 100-6 can play the drama. Or, if the terminal device 100 transmits information on the recommended service to the cloud 31, the cloud 31 can transmit a command to the TV 100-6 to make the TV execute the recommended service.

Meanwhile, although the IA 71 can automatically recommend a service, the IA can be called according to a command of a user. For example, when a user uses the terminal device 100, IAL may not operate or the user may stop driving the IAL. Or, if context information is not sufficient, the IA 71 can be maintained in a standby state. A user can call the IA 71 by inputting a predetermined command to the terminal device 100. For example, the terminal device 100 can receive a specific pattern input or an input of a specific word or a phrase via voice. Or, the terminal device 100 can wake the IA 71 up by recognizing a specific operation. The IA 71 called by the terminal device can recommend a service to a user by analyzing contexts. If the IA 71 fails to detect a service to be provided, the IA can maintain a standby state until a different command is received from the user. Or, if the IA 71 directly receives a command from the user, the IA can immediately perform the inputted command.

In other word, the IAL of the terminal device 100 can execute the IA. The IA can transceive sensed information, context, and the like with a server. In order to make a user recognize the IA, the IA can be outputted by visual data, auditory data, or tactile data. When an operation of the IA is seen from the external, since the operation of the IA corresponds to an operation of the terminal device 100, the operation of the IA and the operation of the terminal device are used in a manner of being mixed in the present specification.

Figure 11:
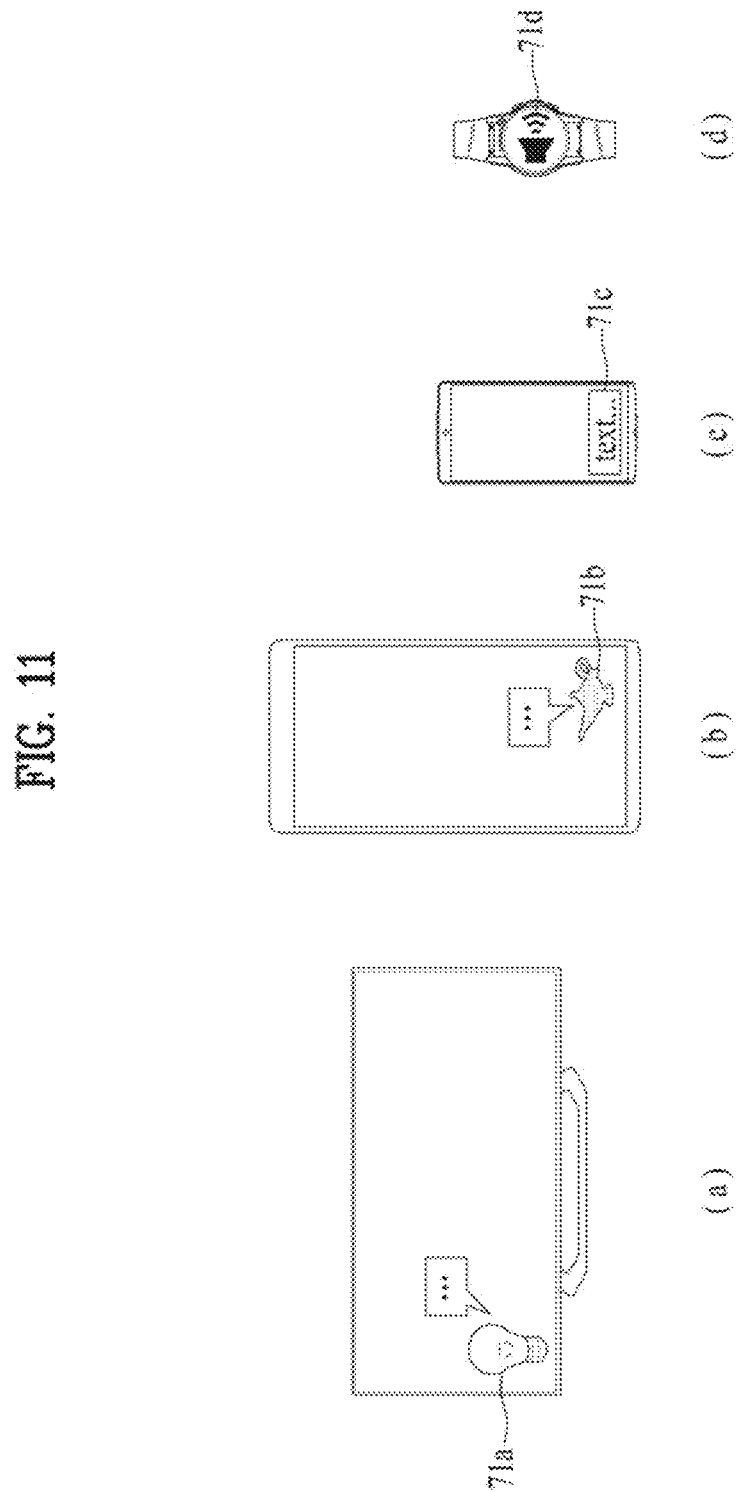
FIG. 11 is a diagram for explaining an output of an intelligent agent according to a property of a terminal device in accordance with one embodiment of the present invention.

FIG. 11 is a diagram for explaining an output of an intelligent agent according to a property of a terminal device in accordance with one embodiment of the present invention. As mentioned in the foregoing description, an IA can be outputted from a terminal device. The IA can be outputted in a different form according to a property of the terminal device instead of being outputted in the same form in all terminal devices. For example, the property of the terminal device can include whether or not the terminal device includes a display unit, a size of a display unit, whether or not the terminal device includes an audio unit, output strength of an audio unit, whether or not the terminal device outputs a vibration, whether or not the terminal device receives a touch input, and the like.

FIG. 11 (a) illustrates an embodiment that IA is outputted in a terminal device of a big size screen. The terminal device of the big size screen can comfortably output the IA 71a. For example, the IA 71a may correspond to an image having a prescribed size and a shape. The IA may output a text as well.

FIG. 11 (b) illustrates an embodiment that IA is outputted in a terminal device of a middle size screen. The IA 71b of the terminal device of the middle size may correspond to an image different from the IA 71a of the terminal device of the big size. For example, the IA 71b of the terminal device of the middle size may have an icon shape. Although the IA 71b of the terminal device of the middle size is able to output a text together with the icon, the IA 71b of the terminal device can be outputted in an image form without a text.

FIG. 11 (c) illustrates an embodiment that IA is outputted in a terminal device of a small size screen. The IA 71c of the terminal device of the small size screen can be outputted in a text form without an image. In some cases, the IA 71c of the terminal device of the small size screen can be outputted in a text form that moves in a prescribed space of the screen.

FIG. 11 (d) illustrates an embodiment that IA is outputted in a terminal device having a very small screen or having no display unit. The IA 71d of the terminal device, which has a very small screen or has no display unit, can be outputted in a form of sound. The sound may correspond to a specific melody or voice.

Figure 12:
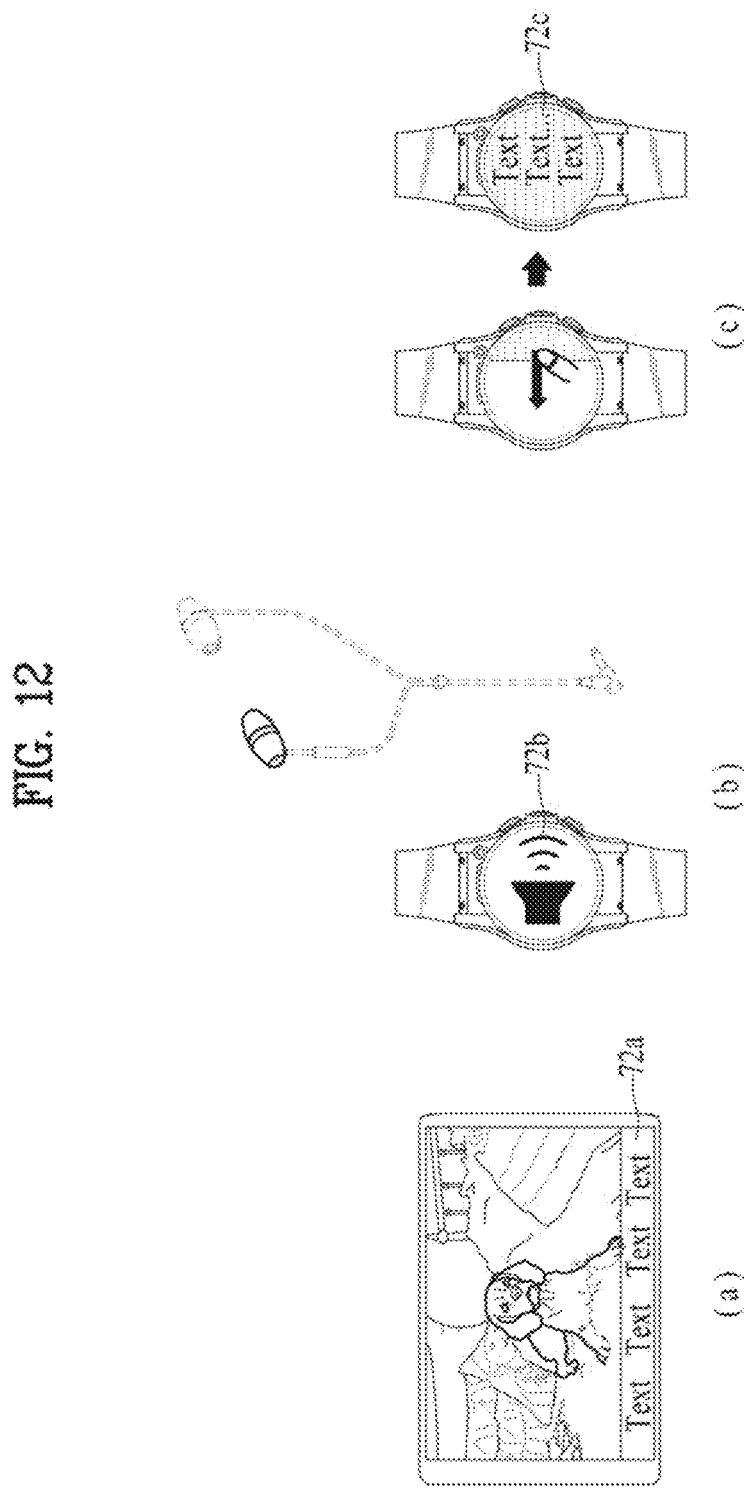
FIG. 12 is a diagram for explaining an output of an intelligent agent according to a property of a terminal device in accordance with a different embodiment of the present invention.

FIG. 12 is a diagram for explaining an output of an intelligent agent according to a property of a terminal device in accordance with a different embodiment of the present invention. An IA can be outputted in various ways in the same terminal device depending on a situation.

FIG. 12 (a) illustrates an embodiment of outputting an AI in a terminal device in which a different content is executed. For example, a terminal device in which content including an image is executed can output an IA 72a in a text form in a certain area of a screen.

FIG. 12 (b) illustrates an embodiment of outputting an AI in a terminal device with which an earphone is connected. In case of an IA 72b of a sound form, if an earphone is connected with a terminal device, the IA 72b can be outputted via the earphone. Or, although an IA is outputted in an image form, if an earphone is connected with a terminal device, the IA can be outputted via the earphone.

FIG. 12 (b) illustrates an embodiment of outputting an AI in a terminal device of a small size screen. In case of an AI 72c of the terminal device of the small size screen, a certain mark is displayed on the screen. If a user flicks the mark, the IA 72c can be displayed on the screen while the screen is changing.

Figure 13:
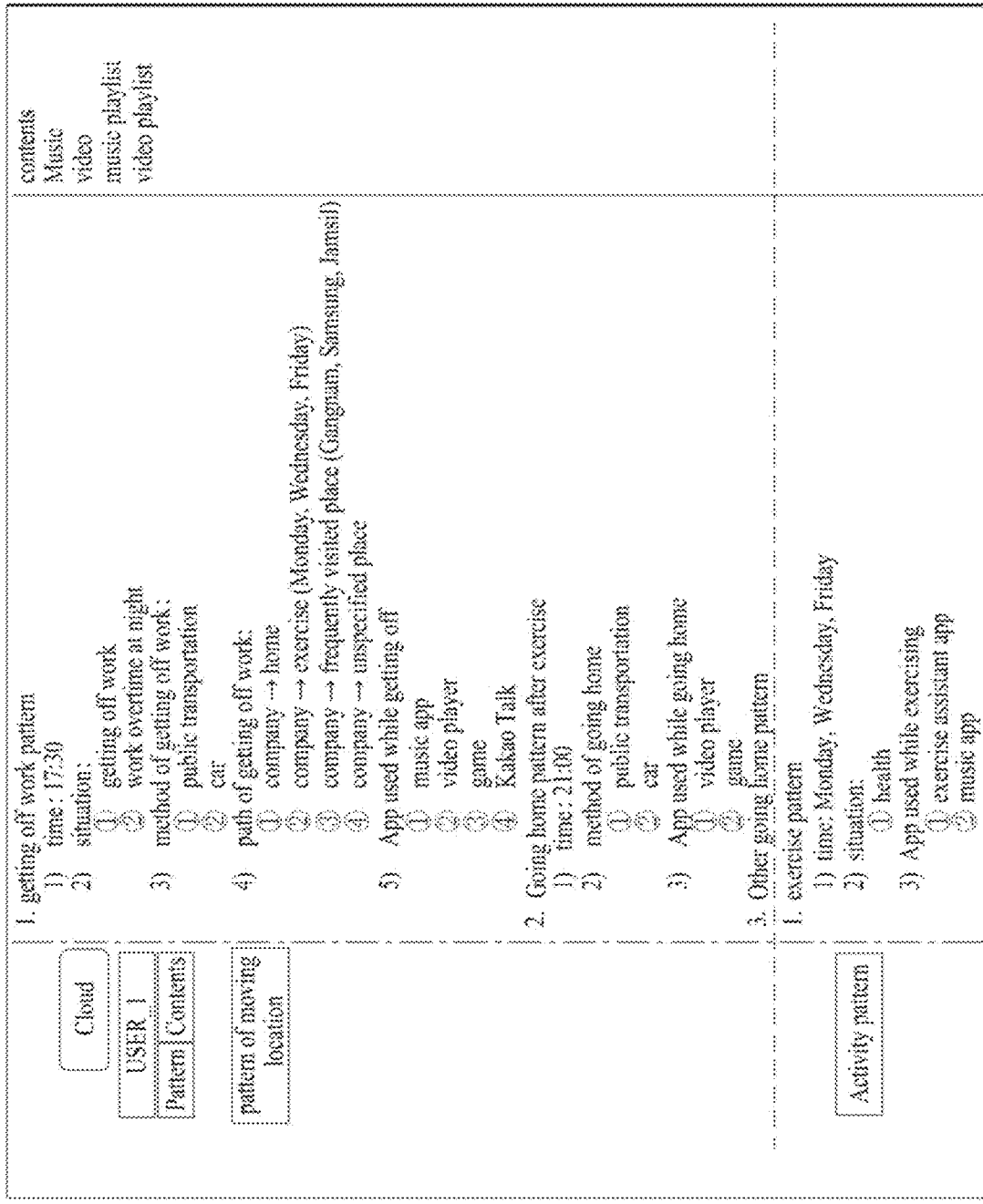
FIG. 13 is a diagram for explaining one embodiment of a user pattern sensed by an intelligent agent system.

FIG. 13 is a diagram for explaining one embodiment of a user pattern sensed by an intelligent agent system.

FIG. 13 illustrates an embodiment of contexts stored in a user profile of a cloud. The cloud can collect context whenever a user uses a terminal device. The cloud can store contexts in the user profile by categorizing the contexts according to a user, a pattern, and contents. For example, a user may have activity patterns shown in FIG. 13 after work. The user gets off work about 5:30 P.M. and may use public transportation or a car when the user gets off work. The user may use a music application, a video application, a game application, and a talk application when the user gets off work. And, the user may exercise 19:00 to 20:30 on Monday, Wednesday, and Friday and may use an exercise assistant application or a music application during the exercise.

FIG. 14 is a diagram for explaining one embodiment of a terminal device sensed by an intelligent agent system and a user pattern including time.

FIG. 14 illustrates one embodiment of a service recommended by a terminal device based on the aforementioned user context. For example, when a user uses a smartphone at about 17:30 corresponding to quitting time, the smartphone may recommend a traffic information service to the user. Specifically, an IA of the smartphone can recommend and provide the traffic information service to the user. The smartphone can receive context from the cloud. Or, the smartphone can receive context from the cloud in advance. A terminal device collects context of a user or periodically transmits collected context to the cloud and receives stored context from the cloud. Hence, the terminal device may have information related to a periodic pattern of the user in advance. When the user gets off work, the smartphone can output path information. Since the user exercises on Monday, Wednesday, and Friday, the smartphone can output a path heading to a fitness center. And, the smartphone can output a path heading to home on Tuesday and Thursday. If the user uses a car to attend an office, the smartphone can output a moving path. If the user use public transportation to attend an office, the smartphone can output public transportation information.

If the user uses a car to attend an office, the smartphone can provide a music application service to the user while the user is heading to a parking lot. If the user is heading to a fitness center using a car, the smartphone may output review information by executing an exercise assistant application. In particular, the terminal device can provide the user with a best service in consideration of received context, currently sensed and generated context, and the like rather than provide a formal service according to a pattern. For example, when a user gets off work, a video application is usually executed. Yet, if the user drives a car, the smartphone can execute a music application rather than the video application. The smartphone may autonomously execute the music application. If car navigation is able to execute the music application, the smartphone can forwards a command to the car navigation to execute the music application. In particular, the IA of the terminal device can provide a best service to the user in consideration of a status of the user and a neighboring terminal device by cooperating with an IA of the neighboring terminal device rather than provide a service to the user according to a pattern. As shown in FIG. 14, each of terminal devices can recommend and provide a service to a user in consideration of contexts.

FIG. 15 is a diagram for explaining a first embodiment that an intelligent agent system provides a service to a user. FIGS. 15 to 20 illustrate embodiments for a user who owns a smartphone 100-7 and a smart watch 100-8.

In FIG. 15, a user uses a smartphone 100-7 and may not wear a smart watch 100-8. The user may go out while carrying the smartphone 100-7 and the smart watch 100-8. The user goes out at 11:00 and can be positioned at a bus stop. The user uses the smartphone 100-7 while holding the smartphone 100-7 by hand and may not wear the smart watch 100-8. The smartphone 100-7 can provide a service to the user in consideration of contexts. The smartphone 100-7 can recognize that the user is going out and is positioned at a bus stop using location information among the contexts.

The smartphone 100-7 is able to know a destination of the user based on pattern information of the contexts. The smartphone 100-7 may infer the destination of the user using call history, schedule, recent search record, and the like as well as periodic pattern information. Or, the smartphone 100-7 may fail to specify the destination of the user. If the smartphone 100-7 knows location information and the destination of the user, the smartphone 100-7 can provide a service related to a bus route capable of moving to the destination to the user. If the smartphone 100-7 knows a position of the user only and does not know a destination, the smartphone 100-7 can provide the user with a service related to a bus route of a current bus stop.

Meanwhile, since the user does not wear the smart watch 100-8, the smart watch 100-8 can maintain a standby state.

Figure 16:
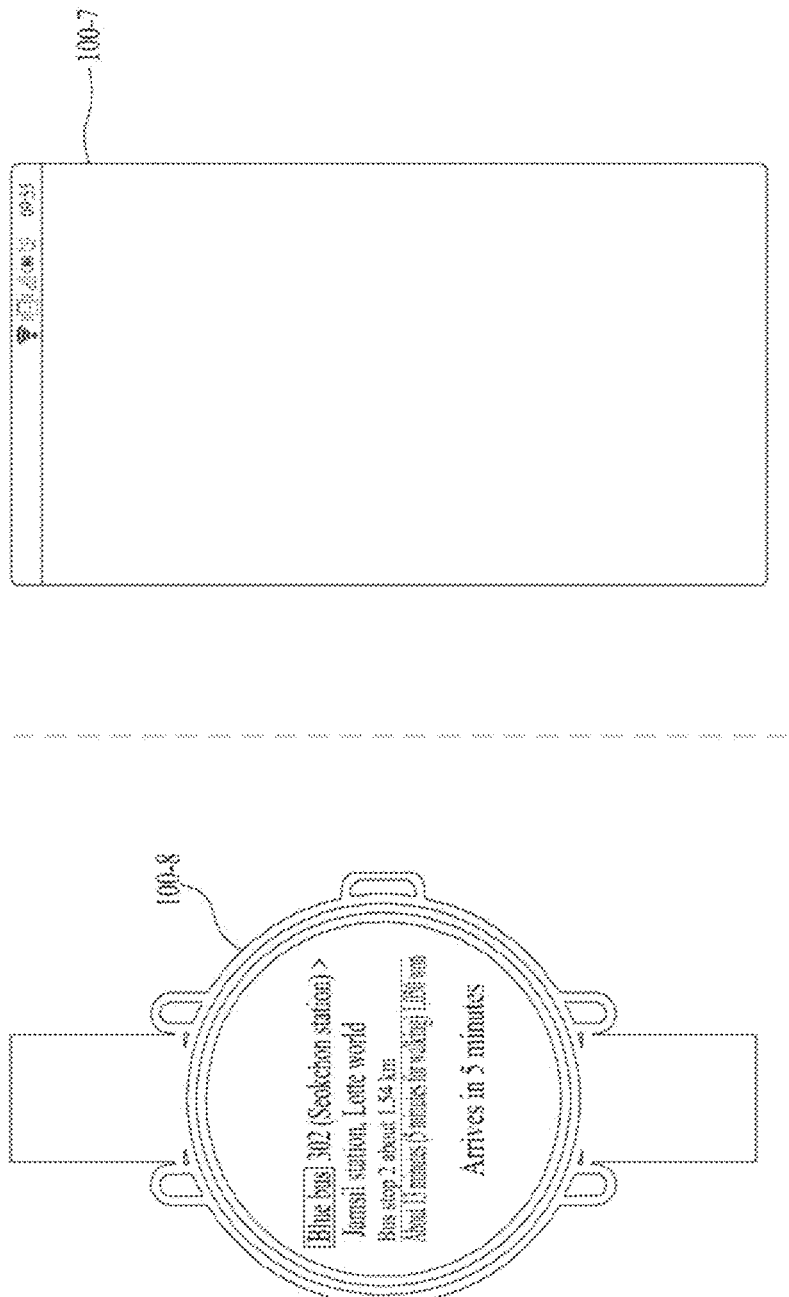
FIG. 16 is a diagram for explaining a second embodiment that an intelligent agent system provides a service to a user.

FIG. 16 is a diagram for explaining a second embodiment that an intelligent agent system provides a service to a user.

Referring to FIG. 16, a user uses the smart watch 100-8 and may not use the smartphone 100-7. Since the user uses the smart watch 100-8, the smart watch 100-8 can provide a service to the user in consideration of contexts. A specific service providing procedure is similar to the aforementioned procedure. Yet, a size of a display unit of the smartphone 100-7 is different from a size of a display unit of the smart watch 100-8. In particular, when the smart watch 100-8 provides a traffic-related service to the user, the smart watch can provide the service to the user with a different scheme. The smart watch 100-8 can output brief traffic information. Specifically, if the smart watch 100-8 knows location information and a destination of the user, the smart watch can provide the user with information on a bus, which most quickly arrives at a current bus stop, only among buses capable of moving to the destination. If the smart watch 100-8 knows a position of the user and does not know the destination, the smart watch can provide the user with information on a bus which most quickly arrives at a current bus stop only. In particular, a terminal device can provide a service to a user based on current context information, received context information, and a property of the terminal device. For example, the property of the terminal device can include whether or not the terminal device includes a display unit, a size of a display unit, whether or not the terminal device includes an audio unit, output strength of an audio unit, whether or not the terminal device outputs a vibration, whether or not the terminal device receives a touch input, and the like.

Figure 17:
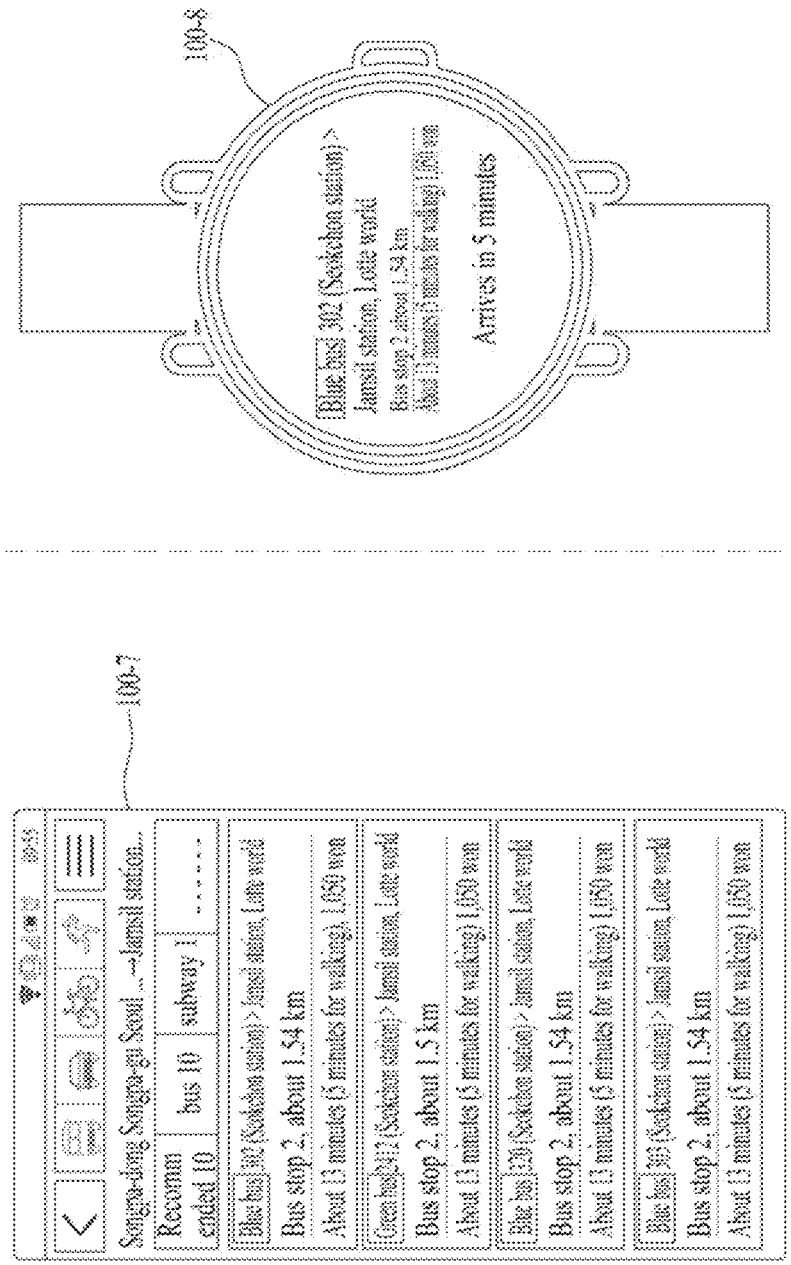
FIG. 17 is a diagram for explaining a third embodiment that an intelligent agent system provides a service to a user.

FIG. 17 is a diagram for explaining a third embodiment that an intelligent agent system provides a service to a user.

FIG. 17 illustrates an embodiment that a smartphone 100-7 and a smart watch 100-8 output a service at the same time. A user can hold the smartphone 100-7 by hand and wear the smart watch 100-8. In this case, the smartphone 100-7 and the smart watch 100-9 can provide a service at the same time. In particular, if a second terminal device recognizes a user as well as a first terminal device, both the first terminal device and the second terminal device can provide a service. If a user uses all terminal devices, both the first terminal device and the second terminal device can provide a service. In some cases, although a user uses the first terminal device only, if the second terminal device is located within an area adjacent to the user, both the first terminal device and the second terminal device can provide a service.

Although the smartphone 100-7 and the smart watch 100-8 provide the same service, the service can be provided in a different form. As mentioned in the foregoing description, a terminal device can provide a service in consideration of a property of the terminal device. In particular, the smartphone 100-7 can provide detail information on a plurality of bus routes to a user. On the contrary, the smart watch 100-8 can provide summary information on a route of a most quickly arriving bus only to a user.

In particular, when a terminal device provides a visual service to a user, if a display unit of the terminal device capable of providing the service is smaller than a prescribed size, the terminal device can visually provide the user with summary information. Meanwhile, if the terminal device providing the service executes a different program, the terminal device can display the service on a prescribed area.

FIG. 18 is a diagram for explaining a fourth embodiment that an intelligent agent system provides a service to a user.

FIG. 18 illustrates an embodiment that a user uses a smartphone 100-7 in a bus. The user uses the smartphone 100-7 and may not wear a smart watch 100-8. Hence, a priority of the smartphone 100-7 can be higher than a priority of the smart watch 100-8. The smartphone 100-7 can provide a service to a user based on contexts. For example, the smartphone 100-7 can provide a talk service to the user by analyzing a situation that the user is in a bus and contexts. In some cases, the smartphone 100-7 can provide the user with a music service or a video service using different information. Since the user does not use the smart watch 100-8, the smart watch can maintain a standby state.

Figure 19:
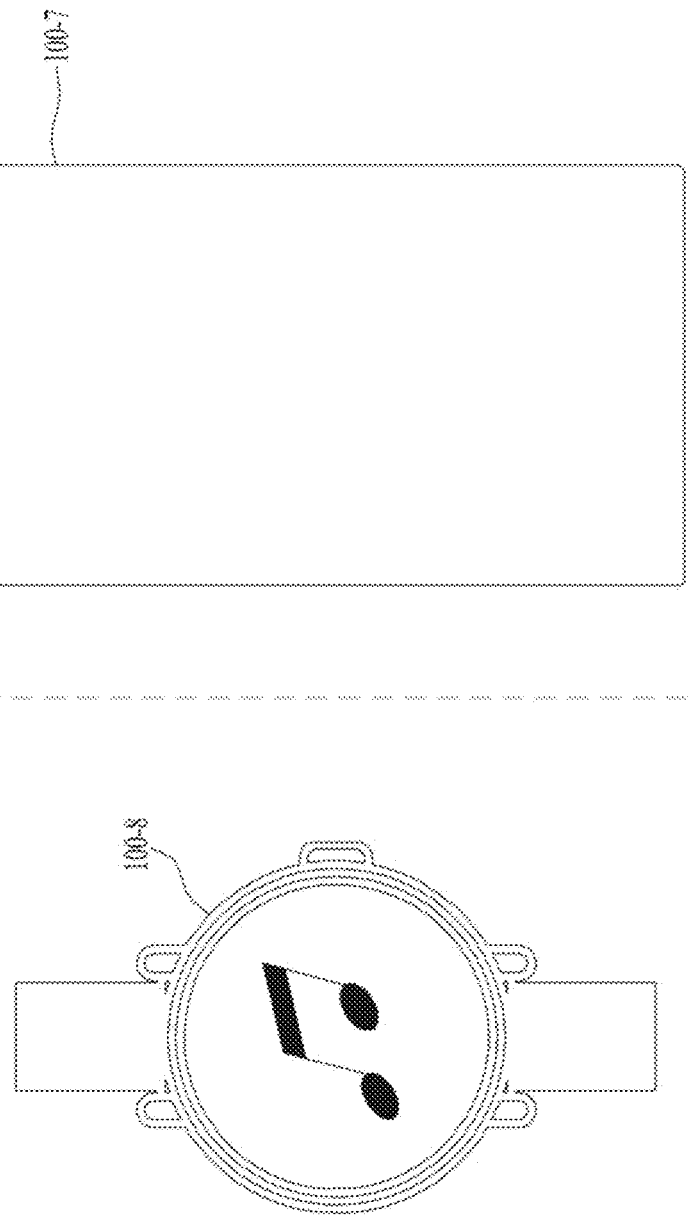
FIG. 19 is a diagram for explaining a fifth embodiment that an intelligent agent system provides a service to a user.

FIG. 19 is a diagram for explaining a fifth embodiment that an intelligent agent system provides a service to a user.

Referring to FIG. 19, a user can wear a smart watch 100-8 in a bus. If the user wears the smart watch 100-8 and gazes at the smart watch 100-8, a priority of the smart watch 100-8 can be higher than a priority of the smartphone 100-7. The smart watch 100-8 can provide a service to the user by analyzing a situation that the user is in a bus and contexts. For example, the smart watch 100-8 can provide the user with a video service, a game service, a music service, a talk service, and the like after the contexts are analyzed. And, the smart watch 100-8 can provide the user with a music service in consideration of a property of the terminal device that a display unit is small and contexts of a use pattern of the smart watch 100-8 of the user. Since the user does not hold the smartphone 100-7 by hand, the smartphone 100-7 can maintain a standby state.

FIG. 20 is a diagram for explaining a sixth embodiment that an intelligent agent system provides a service to a user.

FIG. 20 illustrates an embodiment that a user uses a smartphone 100-7 after a smart watch 100-8 is used. As mentioned in the foregoing description, the user wears the smart watch 100-8 and may not hold the smartphone 100-7 by hand. In this case, the smart watch 100-8 executes a talk application and the smartphone 100-7 may maintain a standby state. The user may stop using the smart watch 100-8 and use the smartphone 100-7. In general, a use pattern of the smartphone 100-7 may correspond to a pattern of using a game service or a video service. Yet, the user used the talk application using the smart watch 100-8 immediately before the smartphone is used. Hence, the smartphone 100-7 can execute the talk application in the smartphone. However, the smartphone 100-7 may recommend a game service or a video service mainly used by the user in the smartphone to the user.

Meanwhile, when a specific application is executed in a first terminal device, an IA can determine whether or not a second terminal device adjacent to a user is able to execute the same application in the second terminal device. If the second terminal device is able to execute the same application, the first terminal device can transmit contents used by the user to the second terminal device when the user uses the second terminal device. The second terminal device outputs the contents received from the first terminal device. In this case, the second terminal device can output the contents in consideration of a property of the second terminal device.

So far, embodiments for providing a service to a user who owns the smartphone 100-7 and the smart watch 100-8 have been explained. An intelligent agent system can include various terminal devices and can be implemented in various ways.

Figure 21:
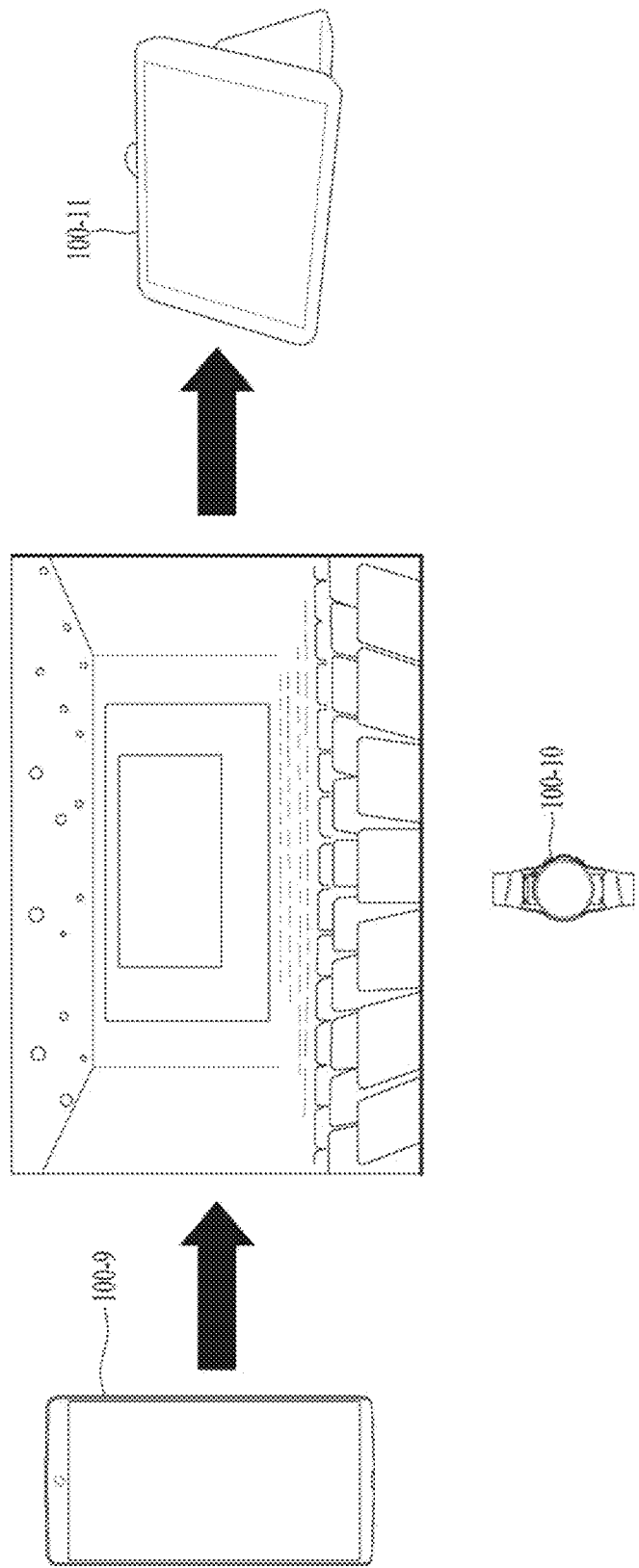
FIG. 21 is a diagram for explaining a seventh embodiment that an intelligent agent system provides a service to a user.

FIG. 21 is a diagram for explaining a seventh embodiment that an intelligent agent system provides a service to a user.

FIG. 21 illustrates a smartphone 100-9, a smart watch 100-10, and a tablet PC 100-11. The smartphone 100-9 performs a movie reservation function and can collect information such as a location of a movie theatre related to the movie reservation, reservation time, and the like. If a user is located at the movie theatre at a screen time, the smartphone 100-9 is able to determine that the user is watching a movie based on the collected information. The smartphone 100-9 generates each of the information as context and can share the context with the smart watch 100-10 and the tablet PC 100-11.

The smart watch 100-10 can sense a bio signal of the user. The smart watch 100-10 measures a heart rate, a stress index, and the like of a user watching a movie and can obtain a likeability of the movie. The smart watch 100-10 also generates each of collected information as context and can share the context with the smart phone 100-9 and the tablet PC 100-11.

The tablet PC 100-11 can recommend a movie or a drama of a genre of high likeability to a user based on the context which is shared when the user selects a movie or a drama.

Figure 22:
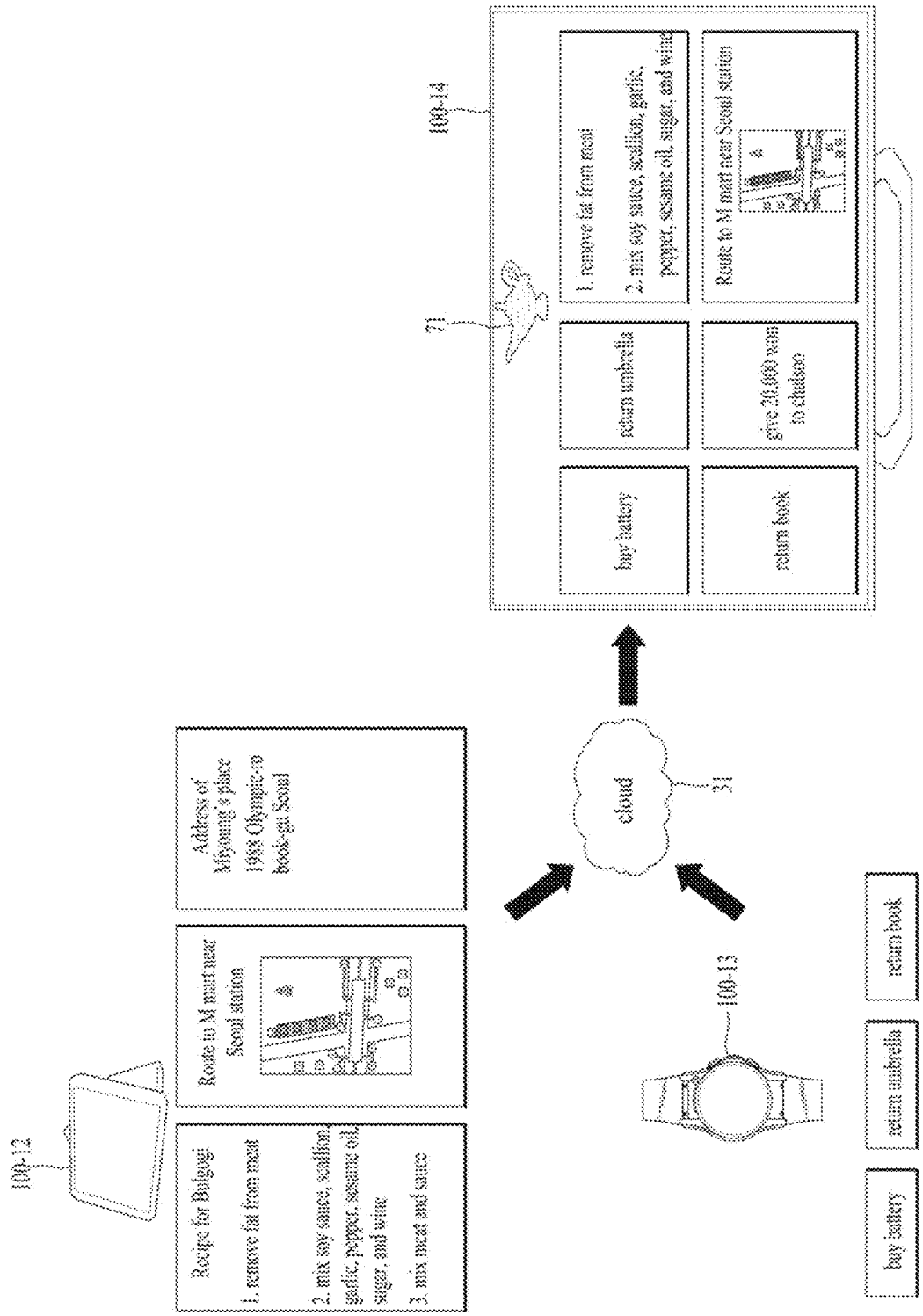
FIG. 22 is a diagram for explaining an eighth embodiment that an intelligent agent system provides a service to a user.

FIG. 22 is a diagram for explaining an eighth embodiment that an intelligent agent system provides a service to a user.

FIG. 22 illustrates a tablet PC 100-12, a smart watch 100-13, and a TV 100-14. FIG. 22 illustrates an embodiment of checking a memo in the TV 100-14.

A user can write a memo while using the tablet PC 100-12. The written memo can be stored in the cloud 31 as a type of contexts. And, the user can write a memo while using the smart watch 100-13. Similarly, the written memo can be stored in the cloud 31.

The user can check the memo stored in the cloud 31 via the TV 100-14. An IA 71 of the TV 100-14 can perform a function according to a command of the user. The TV 100-14 can check a user indicating the memo to be displayed. For example, the TV 100-14 can check a user by recognizing voice of the user or a face of the user. The TV 100-14 can receive memos of the user written in each of devices in a manner of being connected with the cloud 31. The TV 100-14 determines a device in which a memo is written and can automatically configure an output layout. For example, a memo written in the smart watch 100-13 can include simple content. Hence, the TV 100-14 can display the memo written in the smart watch 100-13 in a shape of a small memo paper. A memo written in the tablet PC 100-12 includes detail contents and may include a map as well. Hence, the TV 100-14 can display the memo written in the tablet PC 100-12 in a form of a note having a relatively big size.

Figure 23:
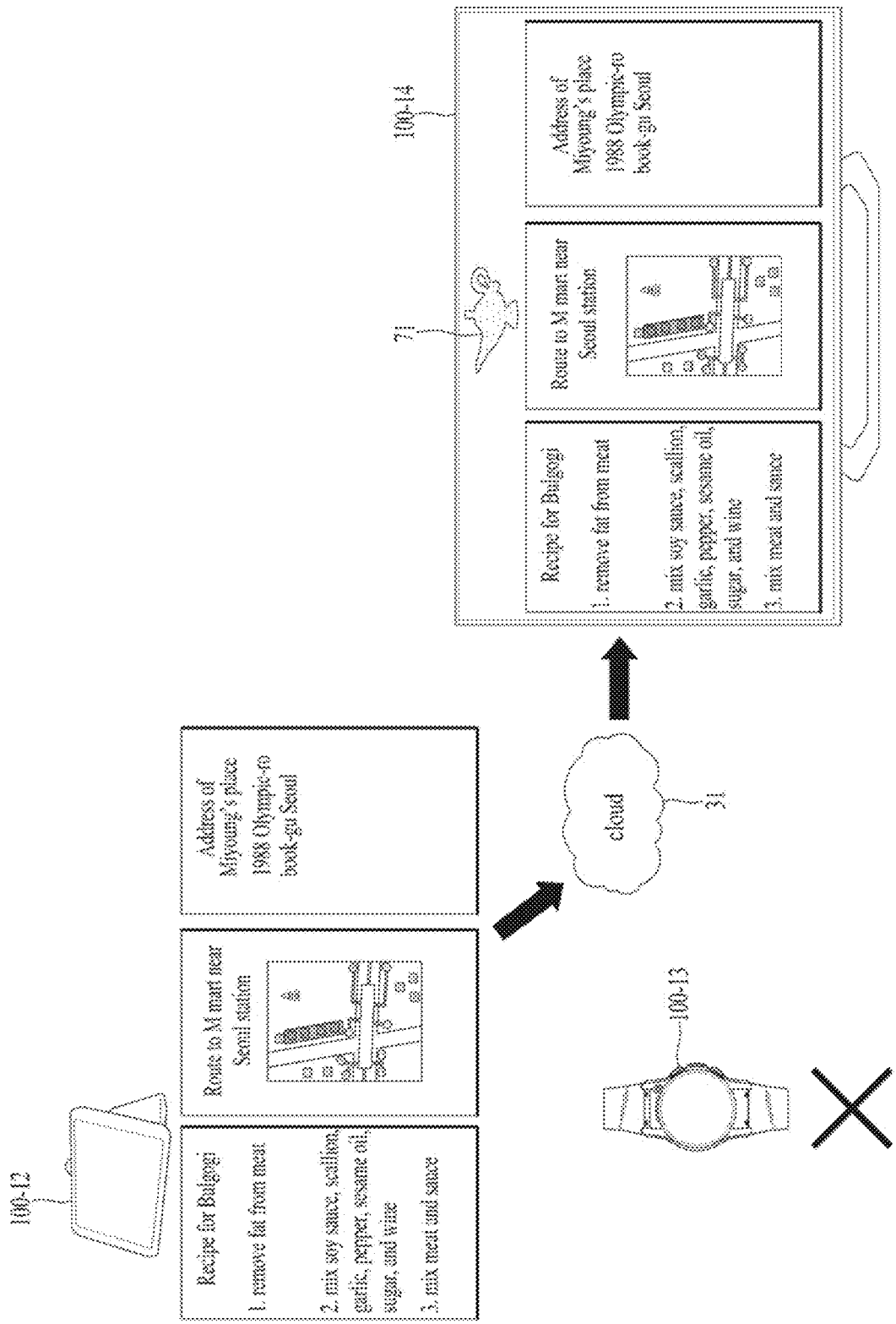
FIG. 23 is a diagram for explaining a ninth embodiment that an intelligent agent system provides a service to a user.

FIG. 23 is a diagram for explaining a ninth embodiment that an intelligent agent system provides a service to a user.

FIG. 23 illustrates a tablet PC 100-12, a smart watch 100-13, and a TV 100-14. Referring to FIG. 23, a memo written in a single device exists only.

A user can write a memo while using the tablet PC 100-12. Yet, no memo is written in the smart watch 100-13. As mentioned in the foregoing description, the memo can be stored in the cloud 31 and the user can check the memo stored in the cloud 31 via the TV 100-14. An IA 71 of the TV 100-14 can perform a function according to a command of the user. The TV 100-14 can receive memos of the user written in each of devices in a manner of being connected with the cloud 31. The TV 100-14 can determine that the received memos are written in the tablet PC 100-12 only. If a memo is written in a single device only, The TV 100-14 determines a device in which a memo is written and can automatically configure an output layout. For example, a memo written in the smart watch 100-13 can include simple content. Hence, the TV 100-14 can display the memo written in the smart watch 100-13 in a shape of a small memo paper. A memo written in the tablet PC 100-12 includes detail contents and may include a map as well. Hence, the TV 100-14 can display the memo written in the tablet PC 100-12 using the same layout.

Figure 24:
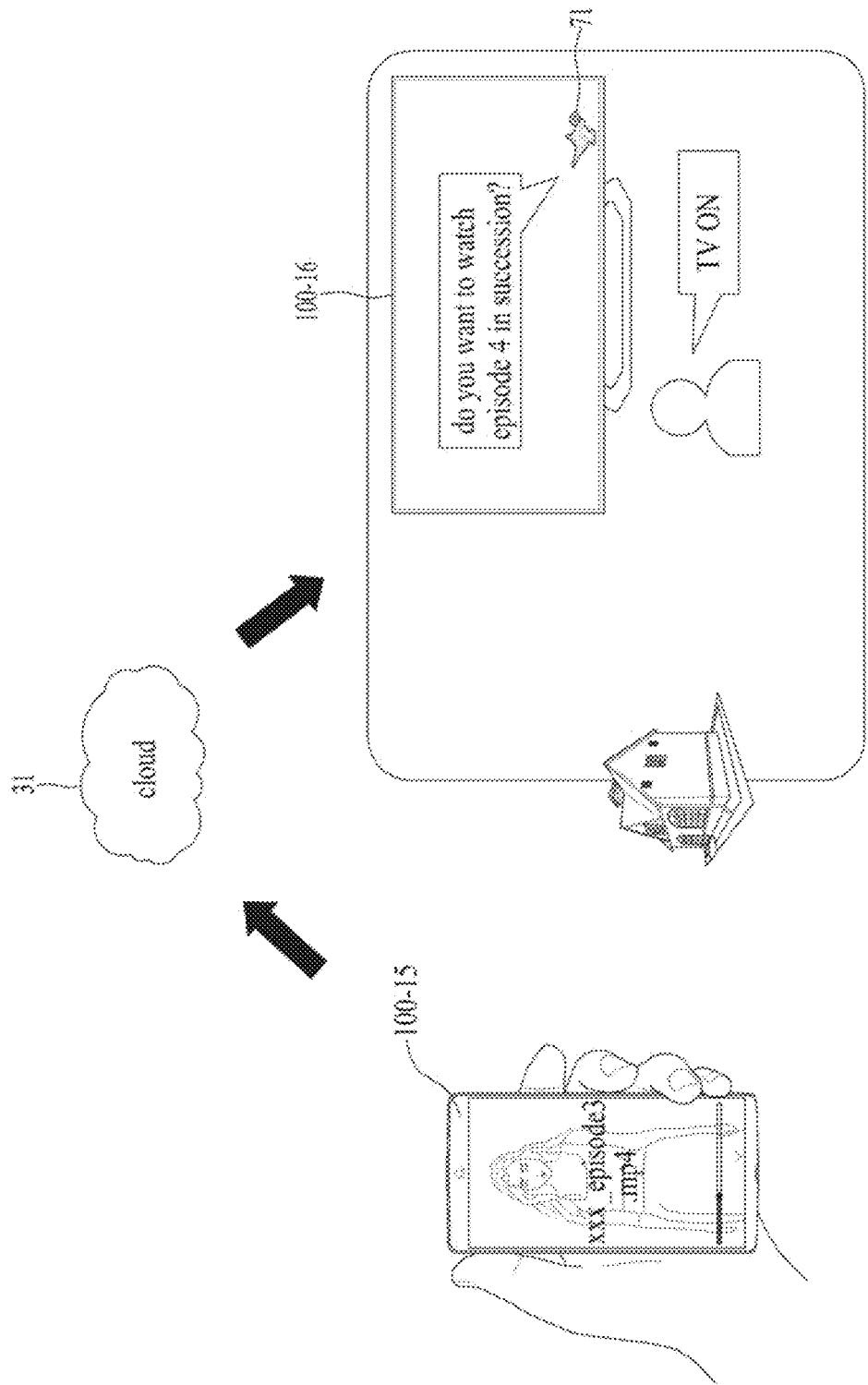
FIG. 24 is a diagram for explaining a tenth embodiment that an intelligent agent system provides a service to a user.

FIG. 24 is a diagram for explaining a tenth embodiment that an intelligent agent system provides a service to a user.

FIG. 24 illustrates a smartphone 100-15 and a TV 100-16. A user can watch a video using the smartphone 100-15 while heading to home. The video may correspond to a broadcasting program or VOD contents. If the user arrives at home or stops using the smartphone 100-15, the smartphone 100-15 can transmit contexts related to the user to the cloud 31. For example, the smartphone 100-15 can transmit information such as arrival time of the user, contents, and the like to the cloud 31. If the user arrives at home, the user may turn on the TV 100-16. The TV 100-16 can check the user. For example, the TV can check the user by recognizing voice of the user or a face of the user. If the user is checked, the TV 100-16 can receive contexts of the checked user from the cloud 31. The contexts received by the TV 100-16 can include content information used to be watched in the smartphone 100-15. An IA of the TV 100-16 can recommend a service to the user based on the contexts. For example, the TV 100-16 may recommend a next episode or continuous watching of a video used to be watched by the user.

As a different embodiment, the user may search for information related to a soccer game using the smartphone 100-15 while heading to home. The smartphone 100-15 can transmit contexts related to the soccer game searched by the user to the cloud 31. If the user arrives at home and turns on the TV 100-16, the IA 71 of the TV receives the contexts from the cloud 31 and can check the information searched by the user. The TV 100-16 can search for a relay broadcast of a soccer game based on the soccer game-related contexts. The TV 100-16 may recommend a channel or a relay broadcast related to a soccer game to the user.

Figure 25:
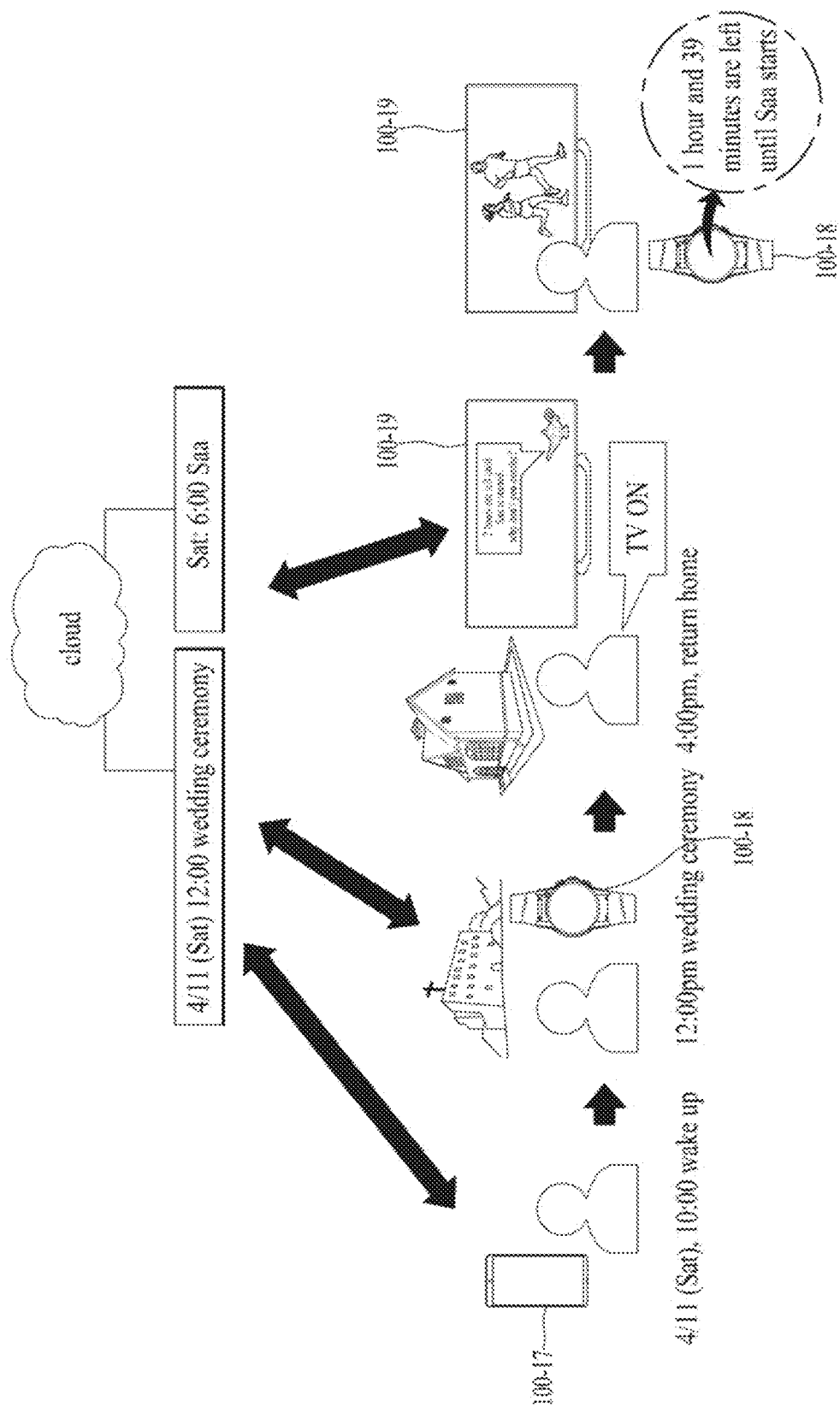
FIG. 25 is a diagram for explaining an eleventh embodiment that an intelligent agent system provides a service to a user.

FIG. 25 is a diagram for explaining an eleventh embodiment that an intelligent agent system provides a service to a user.

FIG. 25 illustrates an embodiment the exercise time is recommended to a user in consideration of schedule, and the like. An intelligent agent system can recommend exercise time to a user in consideration of a health condition of the user, and the like. A terminal device used by the user can recommend exercise time to the user in consideration of a schedule, a location, and the like of the user. Cloud stores information received from each of terminal devices and each of the devices can share the information stored in the cloud. For example, a user has a schedule of participating in a wedding ceremony on Saturday and may want to watch such a program as 'Saa' on Saturday. The wedding ceremony will be held at 12 o'clock and the 'Saa' will be broadcasted at 18 o'clock. The user may wake up at 10 o'clock and use a smartphone 100-17. Since the smartphone 100-17 is able to check that the wedding ceremony is scheduled at 12 o'clock, the smartphone 100-17 may not recommend exercise to the user at 10 o'clock. The user may participate in the wedding ceremony at 12 o'clock while wearing a smart watch 100-18. Since it is inappropriate for the smart watch 100-18 to recommend exercise time to the user, the smart watch 100-18 may not recommend exercise to the user. The user arrives at home at 16 o'clock and may turn on a TV 100-19. The TV 100-19 can check broadcasting schedule of the 'Saa'. The TV 100-19 can check that the user is positioned at home, the user does not have any schedule, and the user has free time as much as two hours until the 'Saa' program is broadcasted. Hence, the TV 100-19 may recommend exercise to the user. If the user accepts the recommendation, the TV 100-19 can play an exercise-related video. And, the smart watch 100-18 can output the remaining time until the 'Saa' program is broadcasted. In particular, terminal devices belonging to an intelligent agent system can cooperate with each other to provide a service to a user.

Figure 26:
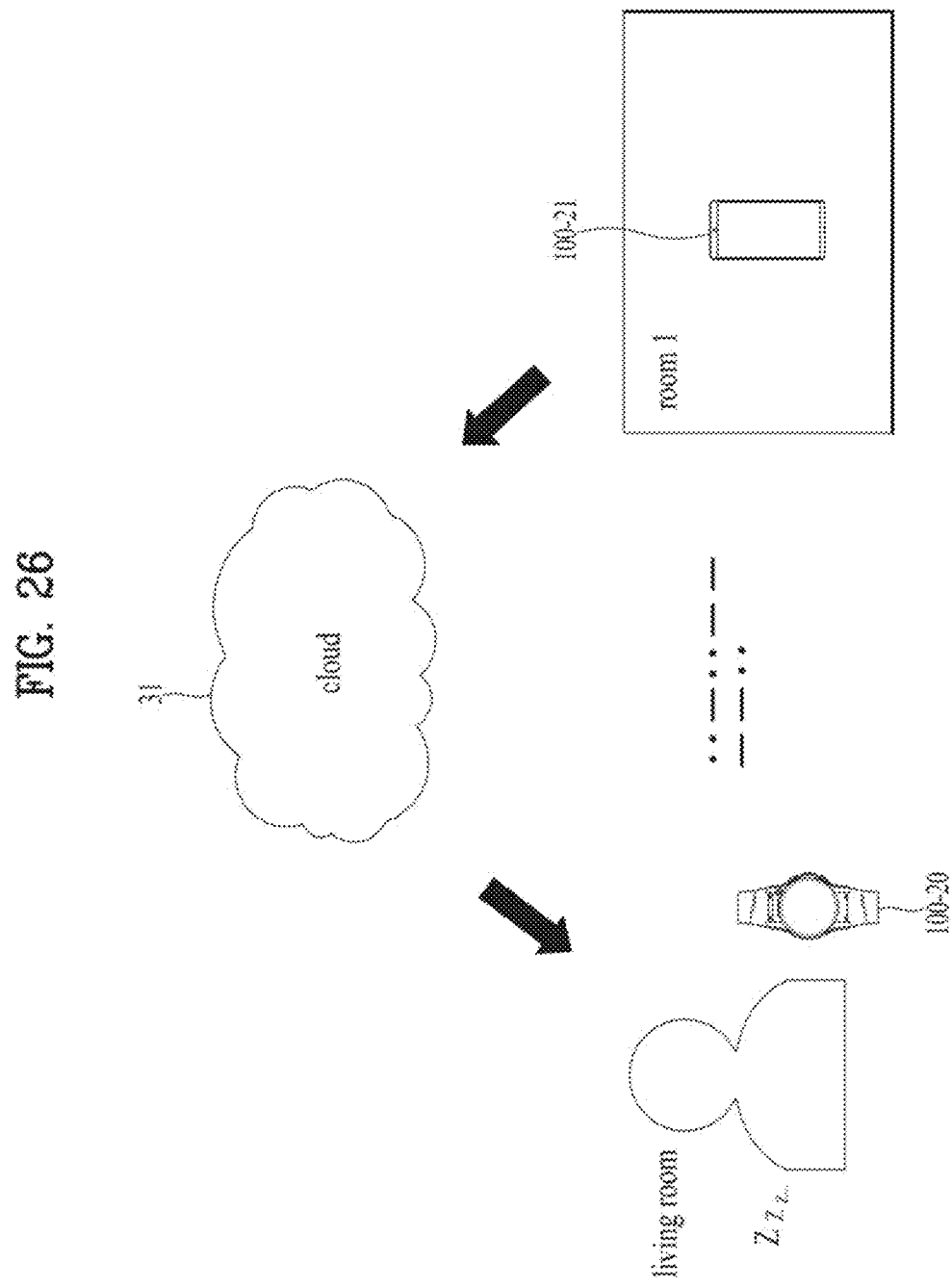
FIG. 26 is a diagram for explaining a twelfth embodiment that an intelligent agent system provides a service to a user.

FIG. 26 is a diagram for explaining a twelfth embodiment that an intelligent agent system provides a service to a user.

FIG. 26 illustrates an embodiment of executing alarm configured by a second terminal device. A user can set alarm in a smartphone 100-21. The smartphone can transmit information on the set alarm to a cloud 31. The user wearing a smart watch 100-20 may sleep in a living room while putting the smartphone 100-21 in a room. The smart watch 100-20 can transmit information on whether or not the user wears the smart watch to the cloud 31. The smartphone 100-21 can forward alarm setting to the smart watch 100-20 worn on the user. In some cases, the smartphone 100-21 can calculate a distance from the smart watch 100-20 using a short-distance communication network. If it is determined as the calculated distance is greater than a prescribed distance capable of listening to an alarm sound, the smartphone 100-21 can forward the alarm setting to the smart watch 100-20. If it arrives at the set time, the smart watch 100-20 can execute the alarm. If the smart watch 100-20 does not have an audio module or is unable to generate a sufficient output, the smart watch may execute the alarm using a vibration. In particular, terminal devices belonging to an intelligent agent system can cooperate with each other to provide a service to a user.

Figure 27:
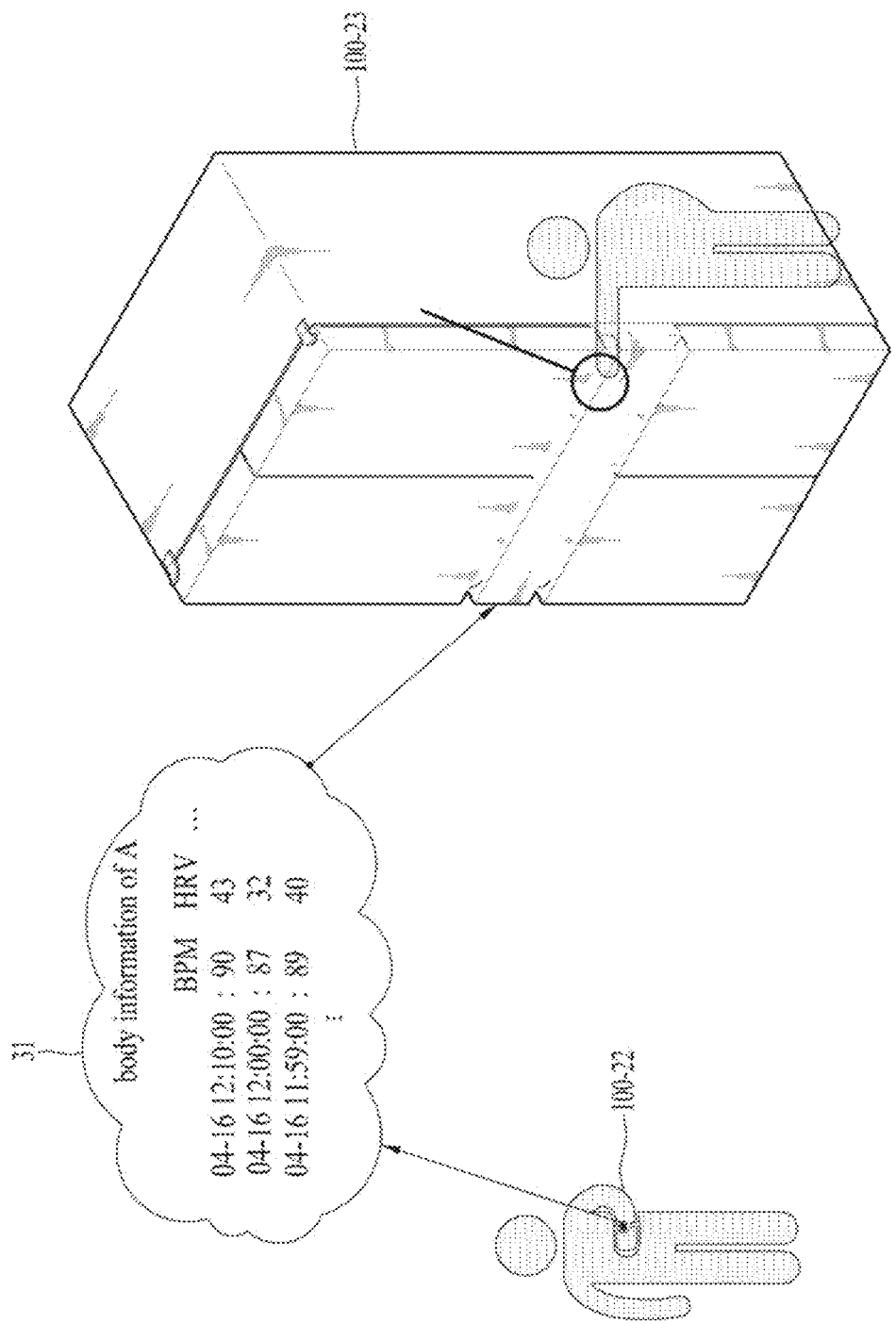
FIG. 27 is a diagram for explaining a thirteenth embodiment that an intelligent agent system provides a service to a user.

FIG. 27 is a diagram for explaining a thirteenth embodiment that an intelligent agent system provides a service to a user.

FIG. 27 illustrates an embodiment of providing a service to a user based on sensed information. A smart watch 100-22 worn on a user senses a bio signal of the user and can generate health condition contexts. The generated contexts can be transmitted to a cloud 31. If the user holds a door handle of a refrigerator 100-23, the refrigerator 100-23 can recognize the user via fingerprint recognition. The refrigerator 100-23 receives the health condition contexts of the user and can display such information as a health condition, a recommended exercise amount, a calorie intake, and the like via a display unit.

As a different embodiment, the user may search for food or a cooking method using a smartphone (not depicted). A search history of the smartphone can be transmitted to the cloud 31. If the user opens a door of the refrigerator 100-23, the refrigerator 100-23 checks the user and may be then able to receive the search history from the cloud 31. The refrigerator 100-23 can inform the user of an area where a material related to the food or the cooking method searched by the user is positioned by changing light emitted to the area.

Meanwhile, if the refrigerator 100-23 does not include a display unit, the refrigerator 100-23 may provide information related to the user or a service to the user using audio. Or, if the refrigerator 100-23 does not include the display unit and the user holds a smartphone (not depicted) by hand, the smartphone may provide the user with information related to the user or a service.

Figure 28:
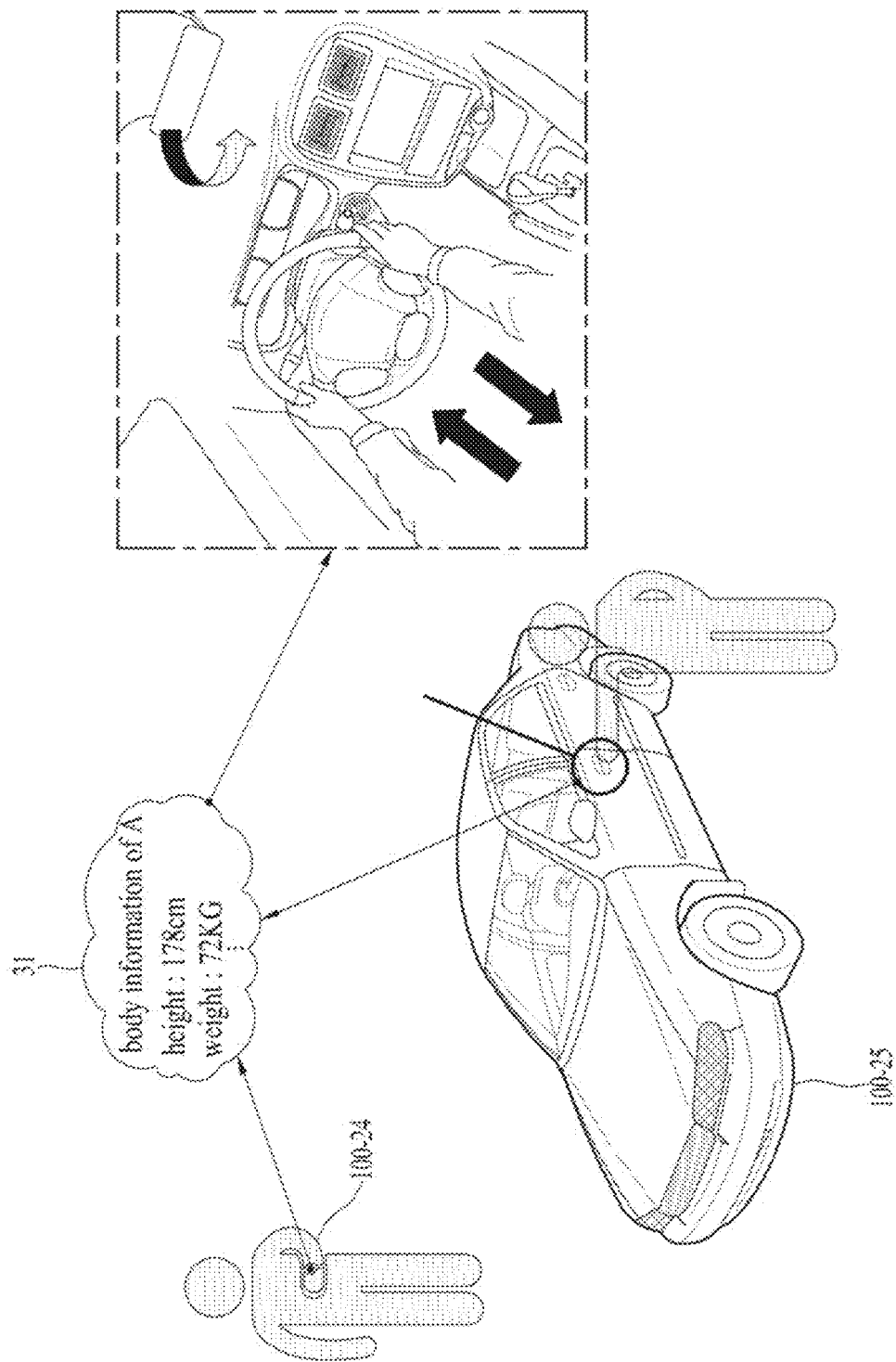
FIG. 28 is a diagram for explaining a fourteenth embodiment that an intelligent agent system provides a service to a user.

FIG. 28 is a diagram for explaining a fourteenth embodiment that an intelligent agent system provides a service to a user.

FIG. 28 illustrates an embodiment of recognizing a user and providing the user with a service appropriate for the user. A smart watch 100-24 measures body information of a user and can transmit the information to the cloud 31. A car 100-25 can also be considered as a terminal device. If the user holds a door handle of a car, the car 100-25 can recognize the user by recognizing fingerprint. The car 100-25 can receive the body information of the user from the cloud 31. The car 100-25 can set car driving environment using the received body information. For example, the car 100-25 can adjust an angle of the back of a driver's seat and a position of the driver's seat, a position and an angle of mirrors, and the like. And, the car may recommend a radio channel preferred by the user to the user or may execute a navigation to recommend a moving path to the user in consideration of a schedule or a pattern of the user. The schedule or the pattern of the user can include contexts stored in the cloud 31 in a manner of being accumulated or a region searched by the user using a smartphone (not depicted) before and after the user gets into the car.

Figure 29:
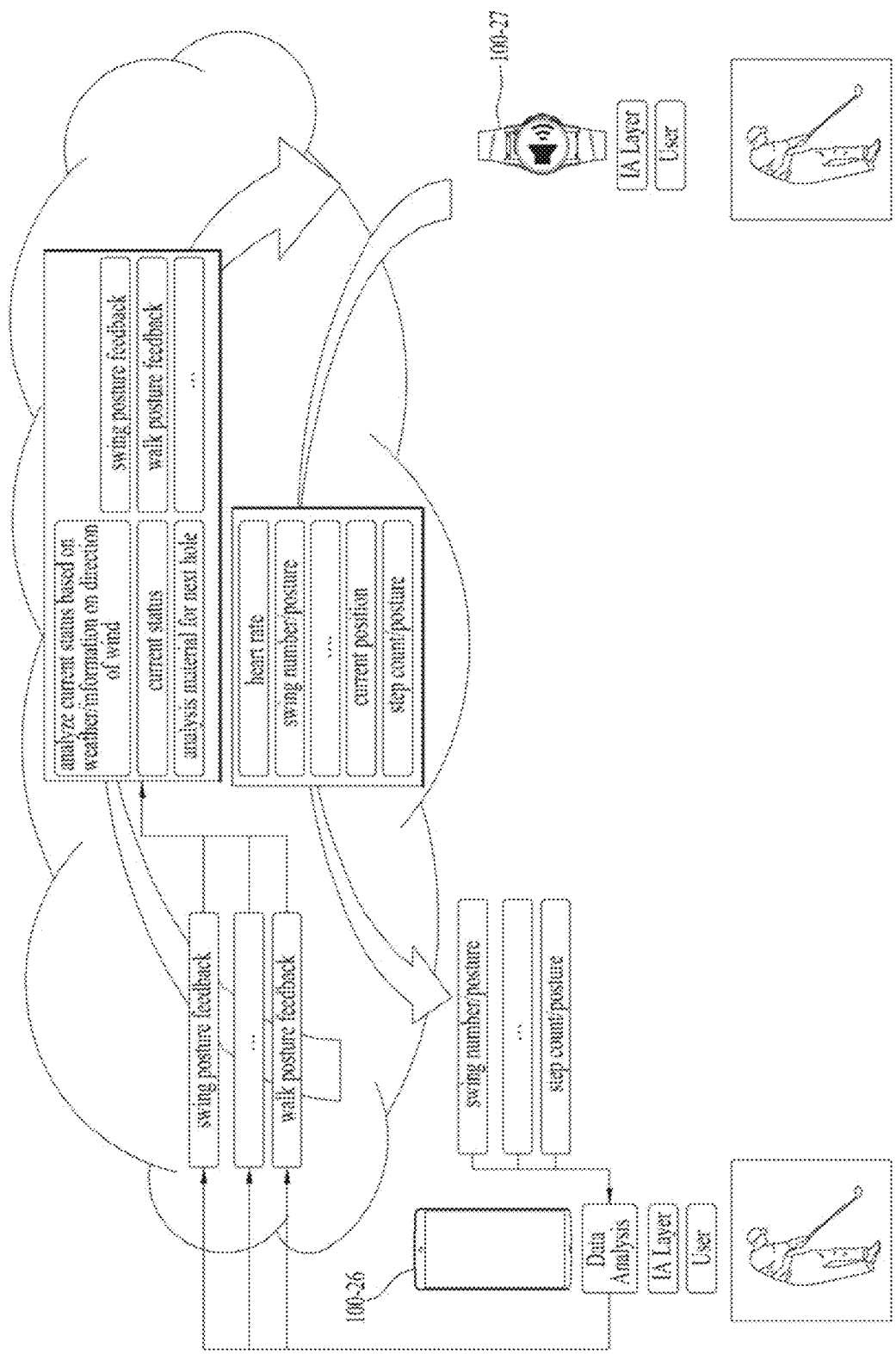
FIG. 29 is a diagram for explaining a fifteenth embodiment that an intelligent agent system provides a service to a user.

FIG. 29 is a diagram for explaining a fifteenth embodiment that an intelligent agent system provides a service to a user.

FIG. 29 illustrates an embodiment of providing an advice to a user. For example, the user may enjoy playing golf while carrying a smartphone 100-26 and a smart watch 100-27. The user can play golf while wearing the smart watch 100-27. When the user moves between holes or takes a break, the smartphone 100-26 or the smart watch 100-27 may inform the user of weather information and information on a hole and recommend a golf club to the user. When the user plays golf, the smart watch 100-27 senses body information and posture information of the user and can provide the user with information necessary for the user. The smart watch 100-27 can transmit the sensed information to the cloud 31. If the exercise ends, the smartphone 100-26 receives the body information and the posture information of the user from the cloud and can provide the user with statistics and analysis results. And, the smartphone 100-126 can share the statistics and the analysis results of the user with the smart watch 100-27 via the cloud.

So far, various embodiments of the intelligent agent system have been explained. In the following, a method of controlling the intelligent agent system is explained using a flowchart.

Figure 30:
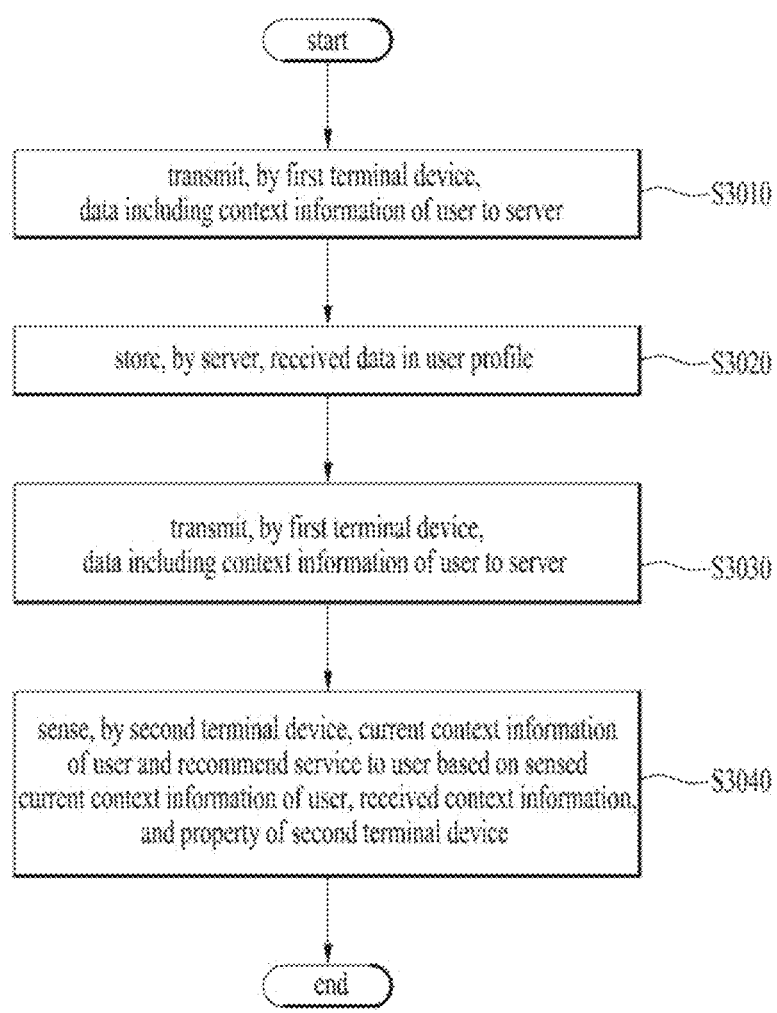
FIG. 30 is a flowchart for a method of controlling an intelligent agent system according to one embodiment of the present invention.

FIG. 30 is a flowchart for a method of controlling an intelligent agent system according to one embodiment of the present invention.

An intelligent agent system can include a plurality of terminal devices and a server. A first terminal device of the intelligent agent system can transmit data including context information of a user to the server [S3010]. The context information can include currently sensed various information and information on a currently used application, a file, a data and contents. The context information may correspond to information for identifying a meaning according to a combination of information rather than individual fragmentary information. The context information can be generated by the first terminal device. Or, if the first terminal device transmits individual information to the server, the server can generate the information as the context information.

The server of the intelligent agent system can store the received data in a user profile [S3020]. The server can generate the profile according to a user. The server can store data transmitted by a terminal device registered at the user profile.

If a second terminal device of the intelligent agent system recognizes a user, the second terminal device requests data including context information of the recognized user to the server and receives the data from the server [S3030]. The user can be recognized using such a scheme as fingerprint recognition, face recognition, voice recognition, an input pattern, a password, and the like.

The second terminal device can sense current context information of the user. The second terminal device can recommend a service to the user based on the current context information of the recognized user, received context information, and a property of the second terminal device [S3040]. The property of the second terminal device can include whether or not the second terminal device includes a display unit, a size of a display unit, whether or not the second terminal device includes an audio unit, output strength of an audio unit, whether or not the second terminal device outputs a vibration, whether or not the second terminal device receives a touch input, and the like. If a recommended service is selected, the second terminal device can execute the service. Meanwhile, if the second terminal device does not have a service to recommend, the second terminal device may wait for a command of the user.

Figure 31:
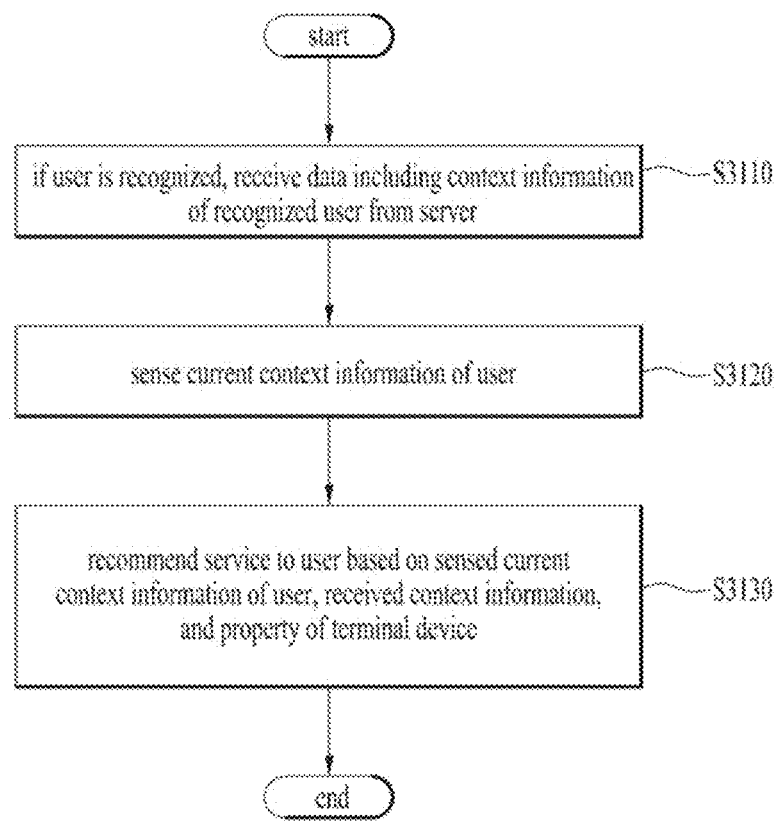
FIG. 31 is a flowchart for a method of controlling a terminal device according to one embodiment of the present invention.

FIG. 31 is a flowchart for a method of controlling a terminal device according to one embodiment of the present invention.

FIG. 31 illustrates a flowchart for a method of controlling a terminal device providing a service. If the terminal device recognizes a user, the terminal device can receive data including context information of the recognized user from a server [S3310]. The terminal device includes an intelligent agent layer (IAL) and can drive an intelligent agent (IA). The IA senses a user or a nearby signal and can transmit the sensed user or the signal to the server. The IA of the terminal device providing a service receives data including context information from the server and can provide a service to a user based on the received data.

The terminal device can sense current context information of a user [S3120]. Context information received by the terminal device corresponds to context information sensed by a different terminal device. Hence, the terminal device can sense the current context information to determine a current status of the user and a surrounding status.

The terminal device can recommend a service to the user based on the sensed current context information of the user, the received context information, and a property of the terminal device [S3130].

Various embodiments of the present invention may be implemented using a machine-readable medium having instructions stored thereon for execution by a computer to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The computer may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A method of controlling an intelligent agent system, the method comprising:
- transmitting, by a first terminal device, data including context information of a user to a server;
- storing, by the server, the received data in a user profile;
- performing, by a second terminal device, a user authentication procedure using at least one of fingerprint recognition or face recognition;
- receiving, by the second terminal device, data including the context information of the user from the server when the user is recognized by the user authentication procedure;
- sensing, by the second terminal device, current context information of the user; and
- recommending, by the second terminal device, a service to the user based on the sensed current context information of the user, the received context information, and a property of the second terminal device.

2. The method of claim 1, further comprising transmitting, by the second terminal device, the data including the sensed current context information of the user to the server.

3. The method of claim 1, further comprising maintaining, by the second terminal device, turn-on of an intelligent agent layer in a standby state and sensing the current context information of the user.

4. The method of claim 1, wherein the property of the second terminal device includes at least one of whether or not the second terminal device includes a display unit, a size of a display unit, whether or not the second terminal device includes an audio unit, output strength of an audio unit, whether or not the second terminal device outputs a vibration, and whether or not the second terminal device receives a touch input.

5. The method of claim 1, wherein recommending the service comprises outputting an intelligent agent.

6. The method of claim 5, wherein when there is no service to be recommended, the intelligent agent inquires of the user about a service to be provided.

7. The method of claim 1, further comprising providing, by the second terminal device, the recommended service to the user.

8. The method of claim 7, wherein when the service includes an image, but the second terminal device does not include a display unit, the second terminal device provides the service via voice.

9. The method of claim 8, wherein when a third terminal device recognizing the user comprises a display unit, the third terminal device provides the service by displaying the image on the display unit.

10. The method of claim 7, wherein when the service includes an image and a display unit of the second terminal device has a size smaller than a predetermined size capable of providing the image of the service, providing the recommended service comprises displaying an image including summary information of the service on the display unit.

11. The method of claim 7, wherein when the service includes an image and a display unit of the second terminal device displays different contents, providing the recommended service comprises displaying the service on a predetermined area of the display unit.

12. The method of claim 7, wherein when a third terminal device recognizing the user exists, both the second terminal device and the third terminal device provide the service.

13. An intelligent agent system, comprising:
- a first terminal device configured to transmit data including context information of a user to a server;
- a server configured to store the received data in a user profile; and
- a second terminal device configured to:
  - perform a user authentication procedure using at least one of fingerprint recognition or face recognition;
  - receive data containing the context information of the user from the server when the user is recognized by the user authentication procedure;
  - sense current context information of the user; and
  - recommend a service to the user based on the sensed current context information of the user, the received context information, and a property of the second terminal device.

14. The intelligent agent system of claim 13, wherein the second terminal device is configured to maintain turn-on of an intelligent agent layer in a standby state and sense the current context information of the user.

15. The intelligent agent system of claim 13, wherein the second terminal device is configured to output an intelligent agent.

16. The intelligent agent system of claim 13, wherein the second terminal device is configured to provide the recommended service to the user.

17. The intelligent agent system of claim 16, wherein when the service includes an image but the second terminal device does not include a display unit, the second terminal device is configured to provide the service via voice.

18. The intelligent agent system of claim 17, further comprising a third terminal device comprising a display unit and configured to recognize the user and provide the service by displaying the image on the display unit.

* * * * *